United States Patent
Dennis et al.

(10) Patent No.: US 9,154,952 B2
(45) Date of Patent: *Oct. 6, 2015

(54) SYSTEMS AND METHODS FOR AUTHENTICATING A USER OF A COMPUTER APPLICATION, NETWORK, OR DEVICE USING A WIRELESS DEVICE

(71) Applicant: Finsphere Corporation, Bellevue, WA (US)

(72) Inventors: Charles L. Dennis, Sammamish, WA (US); Randall A. Snyder, Las Vegas, NV (US); Patrick J. Boyle, Seattle, WA (US)

(73) Assignee: Finsphere Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,740

(22) Filed: Aug. 12, 2014

(65) Prior Publication Data
US 2014/0351899 A1    Nov. 27, 2014

Related U.S. Application Data

(63) Continuation of application No. 12/992,064, filed as application No. PCT/US2009/003007 on May 13, 2009, now Pat. No. 8,839,394, application No. 14/457,740, which is a continuation-in-part of (Continued)

(51) Int. Cl.
*H04W 12/06* (2009.01)
*H04L 29/06* (2006.01)
*G06F 21/35* (2013.01)

(52) U.S. Cl.
CPC .................................. *H04W 12/06* (2013.01)

(58) Field of Classification Search
CPC .......... G06F 21/35; G06F 2221/2111; H04W 12/06; H04W 4/02; H04W 12/08; H04M 1/72572
USPC .......................................... 726/1–9
See application file for complete search history.

(56) References Cited

U.S. PATENT DOCUMENTS

| | | | |
|---|---|---|---|
| 6,430,407 B1 * | 8/2002 | Turtiainen | 455/411 |
| 6,594,666 B1 * | 7/2003 | Biswas et al. | 1/1 |
| 7,188,251 B1 * | 3/2007 | Slaughter et al. | 713/182 |
| 7,487,112 B2 * | 2/2009 | Barnes, Jr. | 705/26.8 |
| 7,669,759 B1 * | 3/2010 | Zettner | 235/380 |
| 7,706,808 B1 * | 4/2010 | Aggarwal et al. | 455/456.1 |
| 8,340,711 B1 * | 12/2012 | Glass et al. | 455/552.1 |
| 2003/0046273 A1 * | 3/2003 | Deshpande | 707/3 |
| 2003/0169881 A1 * | 9/2003 | Niedermeyer | 380/258 |
| 2003/0217137 A1 * | 11/2003 | Roese et al. | 709/223 |
| 2004/0059914 A1 * | 3/2004 | Karaoguz | 713/168 |
| 2004/0221163 A1 * | 11/2004 | Jorgensen et al. | 713/182 |

(Continued)

*Primary Examiner* — Catherine Thiaw
(74) *Attorney, Agent, or Firm* — Foster Pepper PLLC; Richard T. Black; P.G. Scott Born

(57) ABSTRACT

A method and system for authenticating a user includes providing an invocation element capable of being activated by a single user action, receiving an indication that the invocation element has been activated, obtaining a location of a wireless device associated with the user, determining whether the wireless device is associated with an authorized user, approving the user to use the application based on a predetermined location criterion, and producing an indication that the user has been authenticated.

20 Claims, 16 Drawing Sheets

Related U.S. Application Data application No. 12/343,015, filed on Dec. 23, 2008, application No. 14/457,740, which is a continuation-in-part of application No. 14/054,047, filed on Oct. 15, 2013, which is a continuation-in-part of application No. 13/303,809, filed on Nov. 23, 2011, now Pat. No. 8,588,748, which is a continuation-in-part of application No. 12/332,878, filed on Dec. 11, 2008, now Pat. No. 8,116,731, application No. 12/457,740, which is a continuation-in-part of application No. 14/196,861, filed on Mar. 4, 2014, which is a continuation of application No. 11/933,803, filed on Nov. 1, 2007, now Pat. No. 8,374,634, application No. 14/457,740, which is a continuation-in-part of application No. 13/030,759, filed on Feb. 18, 2011, application No. 14/457,740, which is a continuation-in-part of application No. 13/030,794, filed on Feb. 18, 2011, application No. 14/457,740, which is a continuation-in-part of application No. 13/382,900, filed as application No. PCT/US2010/041264 on Jul. 7, 2010, application No. 14/457,740, which is a continuation-in-part of application No. 13/387,991, filed as application No. PCT/US2010/044019 on Jul. 30, 2010, application No. 14/457,740, which is a continuation-in-part of application No. 13/752,741, filed on Jan. 28, 2013, application No. 14/457,740, which is a continuation-in-part of application No. 13/903,663, filed on May 28, 2013.

(60) Provisional application No. 61/053,152, filed on May 14, 2008, provisional application No. 61/027,892, filed on Feb. 12, 2008, provisional application No. 61/058,621, filed on Jun. 4, 2008, provisional application No. 60/895,144, filed on Mar. 16, 2007, provisional application No. 60/909,718, filed on Apr. 3, 2007, provisional application No. 60/979,663, filed on Oct. 12, 2007, provisional application No. 61/305,830, filed on Feb. 18, 2010, provisional application No. 61/306,369, filed on Feb. 19, 2010, provisional application No. 61/223,671, filed on Jul. 7, 2009, provisional application No. 61/223,677, filed on Jul. 7, 2009, provisional application No. 61/230,628, filed on Jul. 31, 2009, provisional application No. 61/591,232, filed on Jan. 26, 2012, provisional application No. 61/652,173, filed on May 26, 2012, provisional application No. 61/659,934, filed on Jun. 14, 2012.

(56) References Cited

U.S. PATENT DOCUMENTS

| | | | |
|---|---|---|---|
| 2004/0224664 A1* | 11/2004 | Guo | 455/411 |
| 2005/0232189 A1* | 10/2005 | Loushine | 370/328 |
| 2006/0129665 A1* | 6/2006 | Toebes et al. | 709/223 |
| 2006/0212537 A1* | 9/2006 | Hans et al. | 709/217 |
| 2007/0100650 A1* | 5/2007 | Ramer et al. | 705/1 |
| 2007/0282954 A1* | 12/2007 | Kim et al. | 709/206 |
| 2008/0155453 A1* | 6/2008 | Othmer | 715/774 |
| 2008/0207217 A1* | 8/2008 | Ramanathan et al. | 455/456.1 |
| 2009/0131080 A1* | 5/2009 | Nadler et al. | 455/456.3 |
| 2009/0249456 A1* | 10/2009 | Malas | 726/6 |
| 2009/0265775 A1* | 10/2009 | Wisely et al. | 726/9 |
| 2010/0131584 A1* | 5/2010 | Johnson | 709/203 |

\* cited by examiner

| Wireless Device ID (MDN) | Authentication Key Information | Location of the Application Access Event | Date; Time | Authentication Results |
|---|---|---|---|---|
| +1-702-555-0000 | 1446743349 | Geographic Name, ID, Address or Coordinates | 09:26:2007; 12:34:56 | Application ID / Results |
| +1-702-555-1234 | 3522921399 | Geographic Name, ID, Address or Coordinates | 09:24:2007; 22:45:07 | Application ID / Results |
| +1-206-555-1111 | 8884326790 | Geographic Name, ID, Address or Coordinates | 09:21:2007; 13:12:45 | Application ID / Results |
| +1-425-555-1234 | 1157320965 | Geographic Name, ID, Address or Coordinates | 09:29:2007; 19:22:23 | Application ID / Results |
| ... | ... | ... | ... | ... |

EXEMPLARY WIRELESS DEVICE ID DATABASE

*Fig. 7*

SYSTEMS AND METHODS FOR AUTHENTICATING A USER OF A COMPUTER APPLICATION, NETWORK, OR DEVICE USING A WIRELESS DEVICE

CROSS REFERENCE TO RELATED APPLICATIONS

This application is a continuation of U.S. patent application Ser. No. 12/992,064 filed on Feb. 9, 2011, which is a 371 National Stage entry of Patent Cooperation Treaty application No. PCT/US2009/03007 filed on May 13, 2009 which claims the benefit of U.S. Provisional Application Ser. No. 61/053,152 filed May 14, 2008 each of which is incorporated herein by reference in its entirety.

This application is a continuation-in-part of and claims the benefit of the filing date of U.S. patent application Ser. No. 12/343,015 filed Dec. 23, 2008, which claims the benefit of U.S. Provisional Application Ser. No. 61/027,892 filed Feb. 12, 2008.

This patent application is a continuation-in-part, and claims the benefit of the filing date, of U.S. patent application Ser. No. 14/054,047 filed on Oct. 15, 2013 which is a continuation of U.S. patent application Ser. No. 13/303,809 filed on Nov. 23, 2011 now U.S. Pat. No. 8,588,748 issued on Nov. 19, 2013 which is a continuation of U.S. patent application Ser. No. 12/332,878, filed Dec. 11, 2008, now U.S. Pat. No. 8,116,731 issued on Feb. 14, 2012 which claims the benefit of U.S. Provisional Application No. 61/058,621, filed Jun. 4, 2008, and also claims the benefit of U.S. Provisional Application No. 61/027,892, filed Feb. 12, 2008.

This patent application is a continuation-in-part, and claims the benefit of the filing date, of U.S. patent application Ser. No. 14/196,861 filed on Mar. 4, 2014 which is a continuation of U.S. application Ser. No. 11/933,803, filed Nov. 1, 2007, now U.S. Pat. No. 8,374,634 issued on Feb. 12, 2013 which claims the benefit of U.S. Provisional Application No. 60/979,663, filed Oct. 12, 2007; U.S. Provisional Application No. 60/909,718, filed Apr. 3, 2007; and U.S. Provisional Application Ser. No. 60/895,144, filed Mar. 16, 2007.

This patent application is a continuation-in-part, and claims the benefit of the filing date, of U.S. patent application Ser. No. 13/030,759 filed on Feb. 18, 2011, which claims the benefit of U.S. Provisional Application No. 61/305,830, filed Feb. 18, 2010.

This patent application is a continuation-in-part, and claims the benefit of the filing date, of U.S. patent application Ser. No. 13/030,794 filed on Feb. 18, 2011, which claims the benefit of U.S. Provisional Application No. 61/306,369, filed Feb. 19, 2010.

This patent application is a continuation-in-part, and claims the benefit of the filing dates of U.S. patent application Ser. No. 13/382,900 filed on Jan. 6, 2012, which is a 371 National Stage entry of Patent Cooperation Treaty application No. PCT/US2010/41264 filed on Jul. 7, 2010 which claims the benefit of U.S. Provisional Application No. 61/223,671, filed Jul. 7, 2009 and U.S. Provisional Application No. 61/223,677, filed Jul. 7, 2009.

This patent application is a continuation-in-part, and claims the benefit of the filing date, of U.S. patent application Ser. No. 13/387,991 filed on Jan. 30, 2012, which is a 371 National Stage entry of Patent Cooperation Treaty application No. PCT/US2010/44019 filed on Jul. 30, 2010 which claims the benefit of U.S. Provisional Application No. 61/230,628, filed Jul. 31, 2009.

This patent application is a continuation-in-part, and claims the benefit of the filing date, of U.S. patent application Ser. No. 13/752,271 filed on Jan. 28, 2013, which claims the benefit of U.S. Provisional Application No. 61/591,232, filed Jan. 26, 2012.

This patent application is a continuation-in-part, and claims the benefit of the filing date, of U.S. patent application Ser. No. 13/903,663 filed on May 28, 2013, which claims the benefit of U.S. Provisional Application No. 61/659,934, filed Jun. 14, 2012 and U.S. Provisional Application No. 61/652,173, filed May 26, 2012.

The contents of each of the foregoing applications are incorporated herein by reference in their entirety.

FIELD OF THE INVENTION

This invention relates generally to authentication of users, and more particularly to automated user authentication for access to computer applications.

BACKGROUND OF THE INVENTION

In the following discussion, the term "entity" is used for illustrative purposes. In general, entities requiring authentication are individuals, data subjects or any electronic or computing devices that may be a subject whose identity requires some form of identity authentication.

Accurate authentication of the identity of users or entities accessing secure computer applications, networks, system and devices or otherwise engaging in secure transactions or activities is a problem that continues to grow. Many solutions have been introduced to detect or prevent unauthorized access to secure computer applications, hardware and software systems that attempt to determine through various means if an entity attempting to access a computer or application is the lawful and rightful user. Also, an increasing number of people rely on secure website applications to carry out their daily business. People conduct both their personal and job-related business using these secure applications. A growing number of people have given up conventional banking in favor of on-line banking to conduct a variety of secure transactions. Many consumers purchase goods and services on-line using sensitive credit card and related information. Even the purchase, sale and management of stocks and securities on-line via stock broker websites have become commonplace. Secure websites have become an integral part of our daily life, and due to the sensitive nature of the transactions and activities performed using these website applications, security is a primary concern. Financial websites are especially concerned with security and are continually adding requirements to reduce incidents of identity theft, as are electronic commerce (e-commerce) website applications. Additionally, there are a variety of on-line non-financial website applications requiring security, such as social networking sites, airline reservation sites, travel sites, media sites, sites where software may be downloaded, secure Internet portals, email sites and the like.

Many of the solutions employed by organizations to provide factual identity authentication for individuals attempting to access their secure websites and other computer applications are based on an authentication factor. Authentication factors are pieces of information used to authenticate or verify a person's identity on appearance or in a procedure for security purposes and with respect to individually granted access rights. Among the most well-known authentication factors are usernames and passwords that are required for access to a particular application. These authentication factors are typically known categorically as knowledge factors. That is, knowledge factors provide a form of authentication based on what an individual knows. Another example of a knowledge factor is a personal identity number or PIN, that is commonly used when individuals access an automatic teller machine (ATM). Other categories of authentication factors are ownership factors and inherence factors. Ownership factors are based on something an individual has, such as a wrist-band or a government-issued identification card. Inherence factors are based on something the individual is or does, such as fingerprint scans, retinal scans and other biometric forms of authentication.

Many highly secure websites and computer applications require more than one type of authentication factor for access. It has become widespread, especially for on-line banking applications, for individuals to apply knowledge factors as well as ownership factors to gain access to the on-line banking application. The ownership factors most commonly used are in the form of security tokens provided to, and maintained by, the individual users themselves.

A security token, also known as a hardware token, authentication token, cryptographic token, or key-fob, may be a physical device that an authorized user of computer applications or services is given to aid with the identity authentication process. The term security token may also refer to software tokens. Security tokens are used to prove one's identity electronically, as in the case of a customer trying to access their on-line bank account. The token is used in addition to, or in place of, a password to prove that the user is who they claim to be. The token acts like an electronic key to access something.

Hardware tokens are typically small enough to be carried in a pocket or purse and often are designed to attach to the user's keychain. Some may store cryptographic keys, such as an electronic digital signature. Some designs feature tamper resistant packaging, while others may include small keypads to allow entry of a PIN or a simple button to start a routine with some display capability to show a generated key number. Some hardware token designs incorporate a universal serial bus (USB) connector, radio frequency identification (RFID) functions or near field communications (NFC) functions that operate based on proximity to the device or application to be accessed. In fact, standard Bluetooth wireless interfaces enable the transfer of a secure generated passkey between a hardware token incorporating Bluetooth capability and secure device or application. Typical examples of this Bluetooth-based capability are the secure association between a mobile phone and a hands-free Bluetooth wireless ear-piece, between a mobile phone and a hands-free Bluetooth mobile phone application in an automobile and between a Bluetooth wireless mouse and a personal computer.

Software tokens may be in the form of electronic data provided to users of secure devices or applications. This electronic data is typically a string of numbers or alphanumeric characters provided to users engaged in a software session with a computer application. The software token electronic data may be sent to users in real-time to a secure device owned by the user while the user is attempting to access a secure application. A typical example of a software token is the automated sending of a string of numeric digits to a user's mobile phone via mobile-based short message service (SMS), commonly known as text messaging, while the user attempts access to an on-line banking website.

Furthermore, many hardware-based token solutions have been introduced to prevent unauthorized access to secure physical facilities. Accurate authentication of the identity of users or entities attempting to access office buildings, homes, automobiles, garages, gates, etc. has become somewhat routine. In many cases, so-called "proximity cards" are used as an ownership-based hardware token solution using radio frequency identification (RFID) tags, near field communications (NFC) or other electro-magnetic communications mechanisms to obtain access to physically secure sites. These solutions typically require users to carry the physical hardware token with them, or have them nearby for use, and individuals may be required to carry and maintain multiple hardware tokens for access to multiple websites, computer applications, office buildings, etc. It is desirable, therefore, to have an automated system that enables individuals to use a single hardware token as a universal ownership authentication factor and the hardware device itself to be a commonly used device that individuals have with them at all times.

In today's culture, mobile phones and other similar wireless devices are items that most people carry with them at all times. They are necessities for most people when leaving the house and are unique among the items we deem necessary to keep with us. They are electronic communications devices and are connected to the largest networks in the world while typically supporting multiple wireless communications mechanisms and technologies. These wireless communications mechanisms include both long-range or network-based communications, as is used for cellular-based telecommunications networks, and local or point-to-point short-range communications, as is used for Wi-Fi- or Bluetooth-based data communications. The primary identifying characteristic of a particular wireless device is typically the dialable mobile directory number (MDN). The MDN can be up to 15 digits long and is a unique number worldwide among all wireless devices, regardless of country or telecommunications network operator. The format of the MDN has been standardized as the E.164 International Public Telecommunication Number by the International Telecommunications Union, a standards making organization within the United Nations. Because the MDN is unique worldwide to an entity's or individual's mobile service subscription and wireless device, it can be considered an extension of the unique identity of that wireless device's user.

Much of the utility of using an entity's or individual's wireless device as an extension of the identity of the user is enabled by the physical security of wireless devices. Wireless devices are inherently secure due to the properties of digital cellular telecommunications. Digital cellular technology has replaced analog cellular technology worldwide and with this advancement came cellular authentication. Cellular authentication uses a cryptographic security protocol and public key infrastructure that is only made possible by digital communications technology. This cryptographic security protocol prevents a mobile directory number from being used by any wireless device other than the one for which it was originally programmed. The only way to re-use a mobile directory number with another device is by special secure provisioning performed within secure network platforms by the wireless network operator. When this secure provisioning occurs, the mobile directory number is securely and solely associated with the device for which it is used. In the case of GSM networks, the secure wireless device is the subscriber identity module, or SIM card, which is associated with an individual and unique mobile service subscription. This is why a SIM card can be used in any GSM-based mobile phone without notifying the wireless network operator. In the case of CDMA networks, the wireless device is the mobile phone itself as removable SIM cards are typically not commercially supported. The inherent nature of cellular authentication enables strong security of wireless devices. If the wireless device (e.g. a mobile phone) does not authenticate properly with the wireless network, wireless service is denied.

The use of user authentication, identification and data interfacing protocols which regulate the flow of data communication between two systems, has long been known in the art. Presently, user authentication, identification and data interfacing protocols are in widespread use for accessing nearly all types of systems ranging from stand-alone personal computers to sophisticated networked supercomputers. As a result, user authentication, identification and data interfacing form an integral part of accessing most computer-based systems in use today.

These user authentication, identification and data interfacing protocols have been developed in a wide variety of electronic manufacturing and software design configurations, depending upon the intended need at the implementation site. Generally, the existing user authentication, identification and data interfacing protocols require a user to enter a username and password at a computer terminal connected to a computer network in order to gain access to the network. The network computer then verifies the validity of the entered data by checking it against stored data prior to granting access to the network.

While an effective approach for obtaining user authentication and identification, the foregoing access method is not without shortcomings. One shortcoming of this approach is its susceptibility to unwanted outside intrusions which compromise the security of the system. Currently, a user's request for access to the system is generally accomplished by a user entering their username and password into the system via a keyboard. This allows for an outside observer to perceive the user's actions, such as the keys typed on the keyboard, in determining the user's access code for subsequent unauthorized access to the user's account. Another shortcoming is the requirement for a user to enter a username and password into a computer terminal each time the user tries to access the system via a different terminal. For example, in the environment of a computer-networked medical care setting, a doctor may access an account containing medical data and patient's profiles from any of the networked computer terminals located in the medical care setting such as those in their office or the operating room, but is required to enter a username and password with each separate access such as those from the same or a different terminal. This increases the risk of an onlooker being able to determine the doctor's access code. In addition, the requirement to enter a username and password at each different terminal can be quite cumbersome to a doctor who must readily remember the username and password and make no typographical errors in entering them into the system, resulting in an inefficient use of the doctor's time. Physical contact with a keyboard also requires the use of the hands which may be otherwise occupied, thus adding to the difficulty of accessing the system. Also, in some ultra-clean environments, such as a medical care setting where a surgeon's hands may be sterilized particularly during or in preparation for a surgery, the requirement to make physical contact with a keyboard may detract from the sterility of a surgeon's hand. In addition, most systems in use today also require that the user log off from the system in order to terminate a session. This also increases the risk of unauthorized access to the account when an already accessed terminal is left unattended and logged in. The requirement to log off can be inefficient and cumbersome.

Other systems in use today may automatically log the user off after a terminal is left unattended for a predetermined period of time. These systems rely on the lack of the user-activity on the terminal as a means to determine whether a user has completed usage of the terminal. The shortcoming of this approach is that the preset time may be still prove to be too long in some cases and too short in others, thus allowing for interim unauthorized access or annoying the user with the repeated need to re-log in. Unauthorized users may also prevent the automatic log off simply by making inputs periodically since the computer has no way of distinguishing whether an entry is made by an authorized user or an unauthorized one once the session is started. A number of location based authentication and fraud reduction systems exist such as those disclosed in U.S. Pat. No. 7,376,431 titled "Location Based Fraud Reduction System and Method" to Niedermeyer, Published Patent Cooperation Treaty Application PCT/IL2006/000775 titled "Improved Location Based Authentication System" to Tomer et al., and U.S. Patent Application Publication No. 2003/0182194 titled "Method and System of Transaction Card Fraud Mitigation Utilizing Location Based Services" to Choey et al. However, these systems each have a number of limitations and drawbacks that limit their effectiveness, scope of applicability, and ease of use.

Accurate user authentication for automated computer applications requiring security is a problem that continues to increase. Many potential solutions have been introduced that attempt to determine through various means if the person accessing a computer or application is the rightful user. Additional computer applications and services are continually being introduced, such as software application service provider (ASP) services, where user authentication is an essential element of the service. Besides online eCommerce fraud, the potential for software and information fraud is just as dangerous. Usernames and passwords are often times not enough to secure computer and system application access.

SUMMARY OF THE INVENTION

In accordance with an example embodiment of the invention, a method for authenticating a user of an application requiring secure access to the application using a mobile access point, a computerized authentication system, and a wireless device associated with the user includes providing an invocation element capable of being activated by a single user action; receiving an indication at the authentication system that the invocation element has been activated; obtaining a location of the wireless device; determining whether the wireless device is associated with an authorized user; approving the user to use the application using the authentication system based on a predetermined location criterion; and producing an indication that the user has been authenticated.

In accordance with other examples of the invention, a system for authenticating a user of an application requiring secure access to the application using a mobile access point in data communication with the application and a wireless device associated with the user includes a memory and a processor in data communication with the memory, the mobile access point, and the wireless device. The processor is configured to provide an invocation element capable of being activated by a single user action; receive an indication that the invocation element has been activated; obtain a location of the wireless device; determine whether the wireless device is associated with an authorized user; approve the user to use the application based on a predetermined location criterion; and produce an indication that the user has been authenticated.

In accordance with yet other examples of the invention, a computer program product is stored in one or more memory devices in data communication with one or more processors associated with an authentication system, a mobile access point, a wireless device associated with a user and/or an application requiring secure access such that the computer program product causes the processors to perform the functions of providing an invocation element capable of being activated by a single user action; receiving an indication that the invocation element has been activated; obtaining a location of the wireless device; determining whether the wireless device is associated with an authorized user; approving the user to use the application based on a predetermined location criterion; and producing an indication that the user has been authenticated.

In accordance with additional examples of the invention, systems and methods are provided that are used for any computer based application or system where the user is required to provide personal identifying information for access or use. This provides additional security against fraudulent access or identity theft.

These and other examples of the invention will be described in further detail below.

BRIEF DESCRIPTION OF THE DRAWINGS

Preferred and alternative examples of the present invention are described in detail below with reference to the following drawings:

FIG. 7 depicts an exemplary Wireless Device ID Database used to associate unique Wireless Device IDs, Authentication Key Information, Locations of Applications Requiring Secure Access, times and dates when the application access events and locations were obtained and Authentication Results.

DETAILED DESCRIPTION OF THE PREFERRED EMBODIMENT

Figure 1:
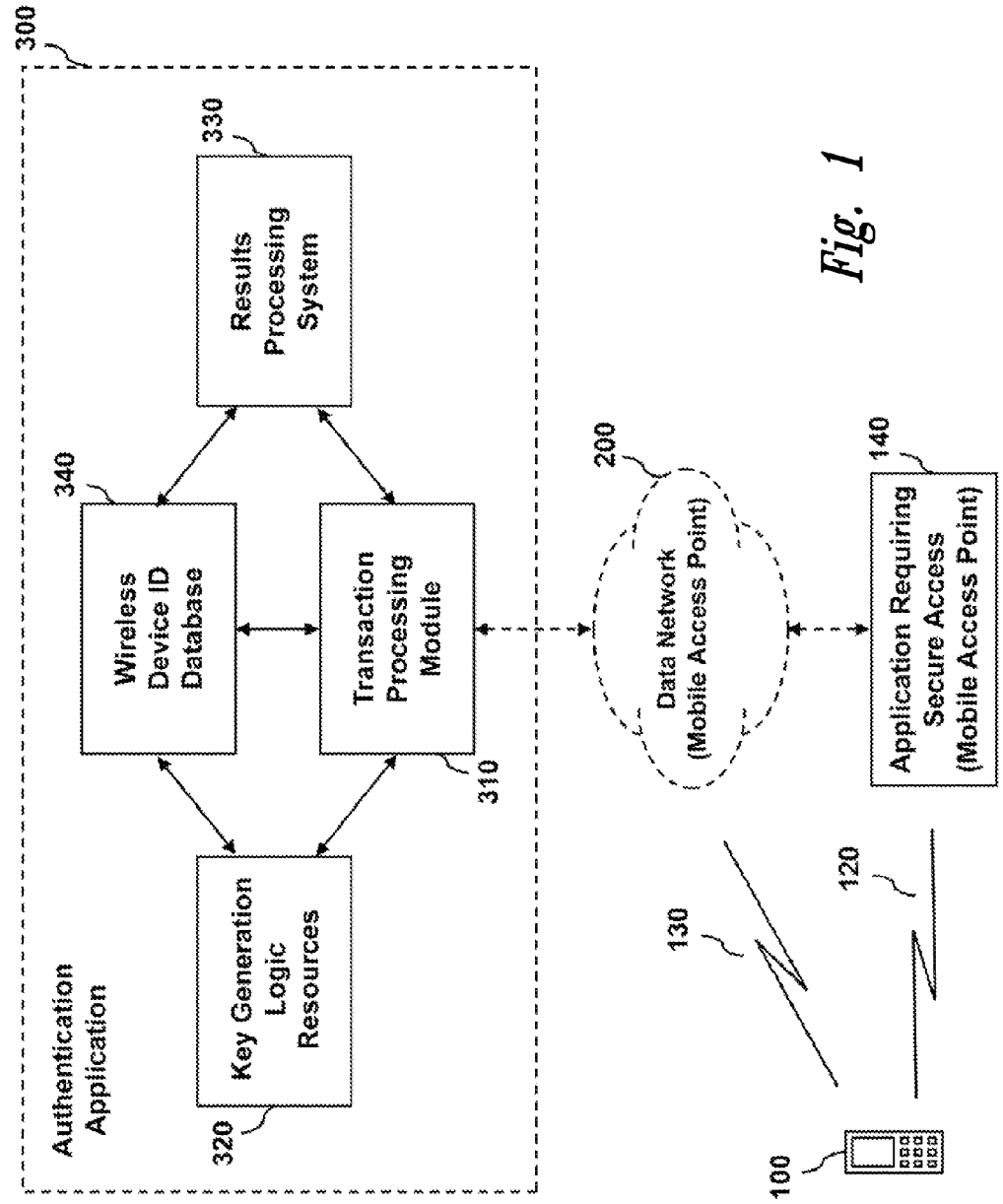
FIG. 1 depicts the functional entities and modules of an exemplary Wireless Device Based User Access Authentication system. Included in the example is an exemplary Authentication Application employing a Transaction Processing Module, a Wireless Device ID Database, one or more Key Generation Logic Resources, a Results Processing System and a Wireless Device communicating with an Application Requiring Secure Access (Mobile Access Point) in accordance with the principles of the present invention.

In FIG. 1, one embodiment of a Wireless Device Based User Authentication system of the present invention includes a Wireless Device 100, an Application Requiring Secure Access associated with the Mobile Access Point 140, an Authentication Application 300 and an optional Data Network associated with the Mobile Access Point 200. The Wireless Device 100 communicates with an Application Requiring Secure Access associated with the Mobile Access Point 140 via a local or point-to-point short-range wireless communications mechanism 120. The Wireless Device 100 may optionally communicate with a Data Network associated with the Mobile Access Point 200 via a long-range or network-based wireless communications mechanism 130. When the Wireless Device 100 enters into proximity of a Mobile Access Point associated with the Application Requiring Secure Access 140, the Wireless Device 100 automatically detects the Mobile Access Point 140 across the wireless communications mechanism 120. Alternatively, when the Wireless Device 100 enters into proximity of a Mobile Access Point associated with the Application Requiring Secure Access 140, the Mobile Access Point 140 automatically detects the Wireless Device 100 across the wireless communications mechanism 120. The Wireless Device 100 and the Mobile Access Point 140 establish and maintain a wireless communications connection. Similarly, the Wireless Device 100 may optionally communicate with a Data Network associated with the Mobile Access Point 200 to enable the Authentication Application 300 to obtain the location of the Wireless Device 100. The location of the Wireless Device 100 may be used to augment or enhance the Authentication Results provided by the Authentication Application 300. The Authentication Application 300 includes a Transaction Processing Module 310, Key Generation Logic Resources 320, a Results Processing System 330 and a Wireless Device ID Database 340, in accordance with the principles of the present invention. The Transaction Processing Module 310 obtains data regarding an application access event from an Application Requiring Secure Access associated with the Mobile Access Point 140. The Transaction Processing Module 310 may communicate with the Application Requiring Secure Access associated with the Mobile Access Point 140 either directly or via an optional Data Network associated with the Mobile Access Point 200. The Transaction Processing Module 310 may communicate with the Key Generation Logic Resources 320 to generate Authentication Key Information for a particular Wireless Device ID during some initial Wireless Device ID registration process. Alternatively, Authentication Key Information may be downloaded to, previously installed or otherwise transferred to the Authentication Application 300 from some other computing device, platform or computer storage and stored in the Wireless Device ID Database 340. The Transaction Processing Module 310 may communicate with the Wireless Device ID Database 340 to provide application access event data for storage such as the Application ID representing, and associated with, the Application Requiring Secure Access 140, the Location of the Application Access Event and the date and time the Location of the Application Access Event was obtained. The Transaction Processing Module 310 may communicate with the Results Processing System 330 to provide application access event data for processing such as the concerned Wireless Device ID, Application ID representing, and associated with, the Application Requiring Secure Access 140, Authentication Key Information, Location of the Application Access Event and the date and time the Location of the Application Access Event was obtained. The Key Generation Logic Resources 320 may communicate with the Wireless Device ID Database 340 to provide generated Authentication Key Information for storage for a particular Wireless Device ID. The Results Processing System 330 may communicate with the Wireless Device ID Database 340 to provide processed Authentication Results for a particular application access event associated with a particular Wireless Device ID and a particular Application ID representing, and associated with, the Application Requiring Secure Access 140. The Results Processing System 330 may communicate with the Transaction Processing Module 310 to provide the Authentication Results to the Application Requiring Secure Access 140 either directly or via an optional Data Network associated with the Mobile Access Point 200. The Application Requiring Secure Access 140 may then apply the Authentication Results to allow access by the user of the Wireless Device 100, deny access to the user of the Wireless Device 100 or provide some degree of access to the user of the Wireless Device 100.

Figure 2:
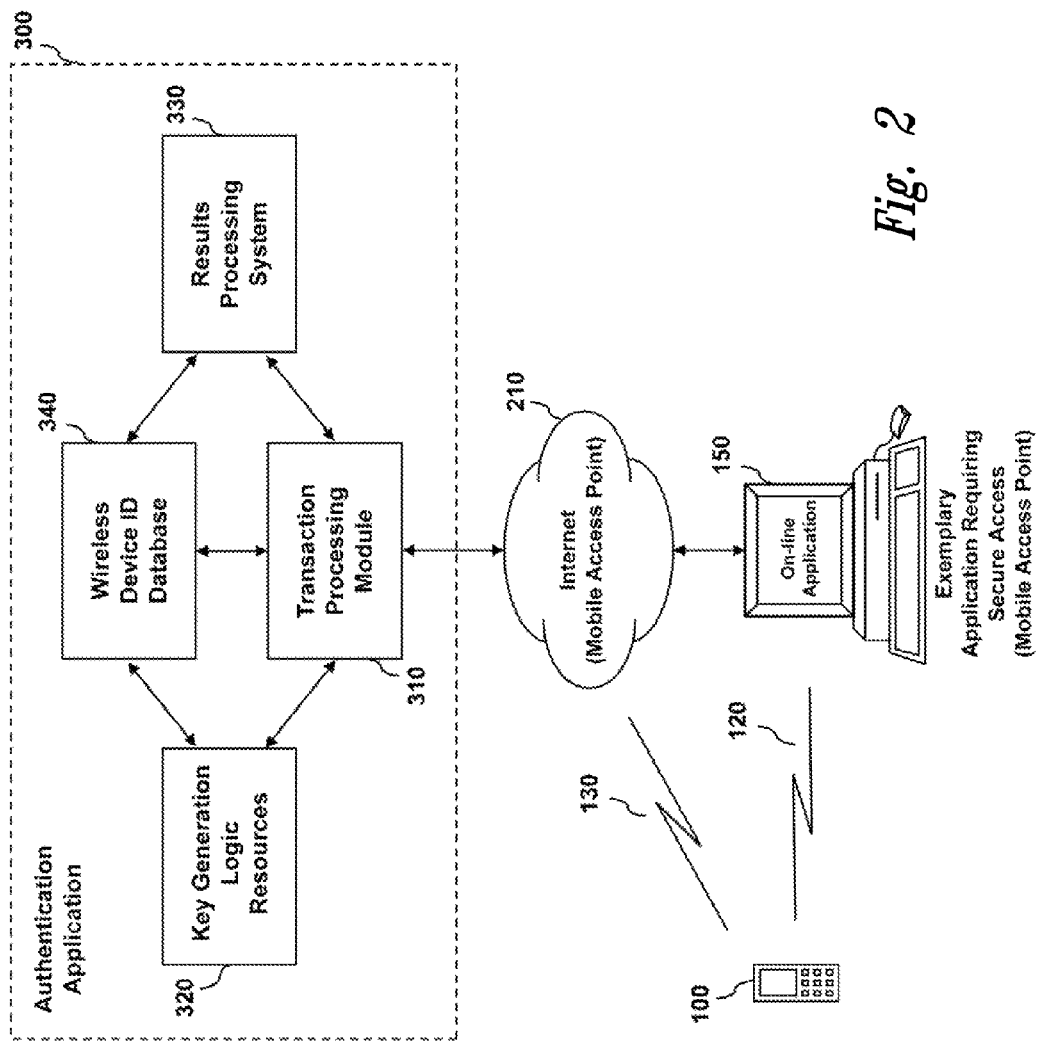
FIG. 2 depicts the functional entities and modules of an exemplary Wireless Device Based User Access Authentication system employed by an On-line Application (Mobile Access Point) and supported by an exemplary Authentication Application.

FIG. 2 depicts the use of one embodiment of a Wireless Device Based User Authentication system by an Exemplary On-line Application Requiring Secure Access 150. One embodiment of an On-line Application Requiring Secure Access 150 may be an Internet-based web application accessed via a personal computer that requires some form of identity authentication before providing access to a user. The Wireless Device 100 communicates with the Exemplary On-line Application Requiring Secure Access associated with the Mobile Access Point 150 (i.e. the personal computer) via a local or point-to-point short-range communications mechanism 120. The Wireless Device 100 may optionally communicate with the Internet associated with the Mobile Access Point 210 via a long-range or network-based communications mechanism 130. When the Wireless Device 100 enters into proximity of the personal computer (i.e. the Mobile Access Point associated with the Exemplary On-line Application Requiring Secure Access 150), the Wireless Device 100 automatically detects the personal computer and establishes and maintains a wireless communications connection with the personal computer across the wireless communications mechanism 120. When the user of the Wireless Device 100 attempts to access the Exemplary On-line Application Requiring Secure Access 150, the Exemplary On-line Application Requiring Secure Access 150 may automatically invoke an application access event. Alternatively, the Exemplary On-line Application Requiring Secure Access 150 may require the user of the Wireless Device 100 to manually take some action to invoke an application access event. The application access event causes the Authentication Application 300 to perform the aforementioned Wireless Device Based User Authentication via the Internet 210. The Authentication Application 300 provides the processed Authentication Results to the Exemplary On-line Application Requiring Secure Access 150 via the Internet 210. The Exemplary On-line Application Requiring Secure Access 150 may then apply the Authentication Results to allow access by the user of the Wireless Device 100, deny access to the user of the Wireless Device 100 or provide some degree of access to the user of the Wireless Device 100.

Figure 3:
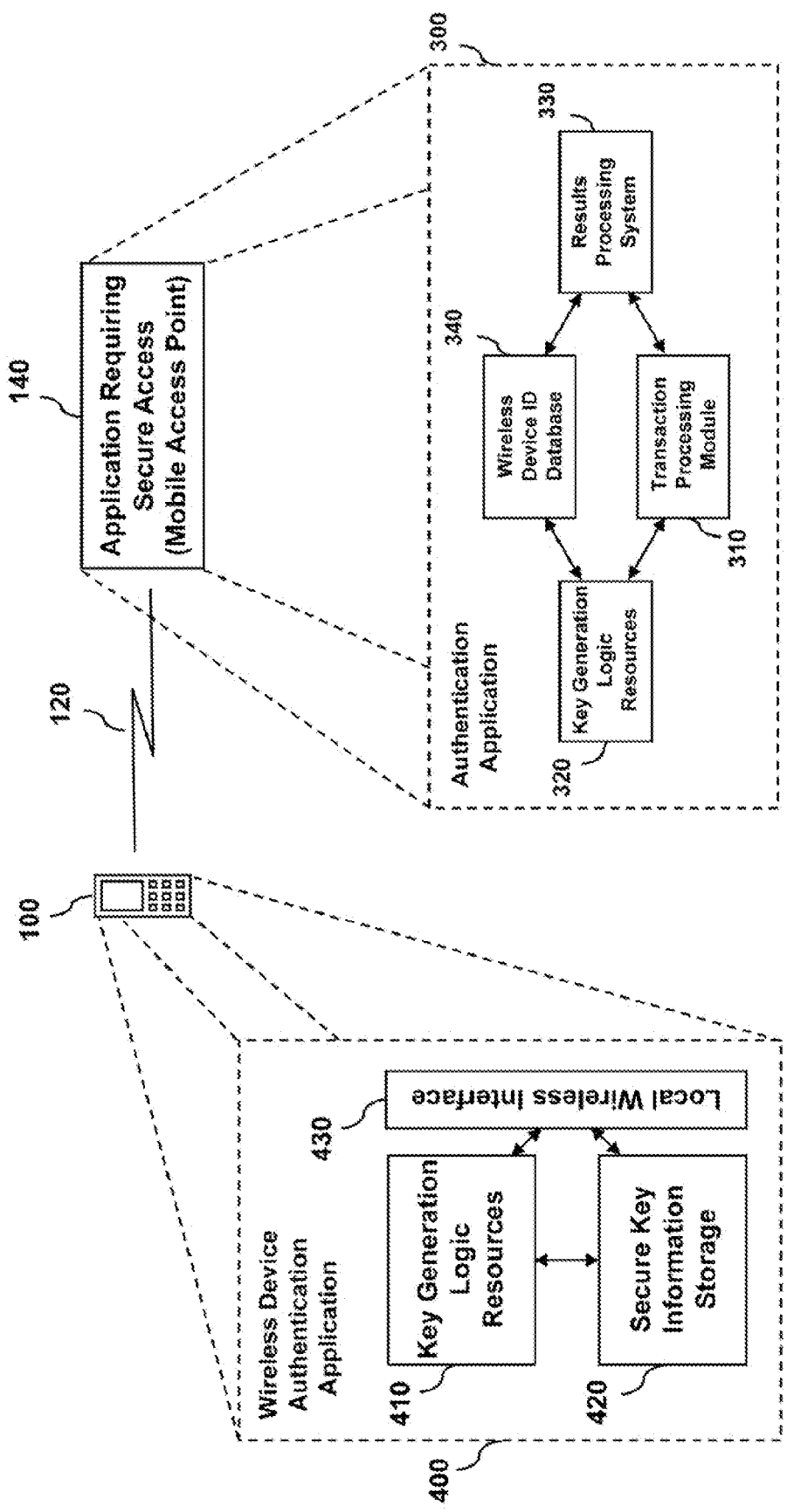
FIG. 3 depicts the functional entities and modules employed by a Wireless Device of an exemplary Wireless Device Based User Access Authentication system. Included in the example is an exemplary Wireless Device Authentication Application employing a Local Wireless Interface, one or more Key Generation Logic Resources and Secure Key Information Storage communicating with an Application Requiring Secure Access (Mobile Access Point) in accordance with the principles of the present invention.

FIG. 3 depicts one embodiment of a Wireless Device Based User Authentication system employing a Wireless Device Authentication Application 400 associated with, and resident on, a Wireless Device 100, a local or point-to-point short-range wireless communications mechanism 120 supporting wireless communications between the Wireless Device 100 and an Application Requiring Secure Access associated with the Mobile Access Point 140 via a Local Wireless Interface 430 on the Wireless Device 100. In this embodiment of the present invention, an Authentication Application 300 is resident with the Application Requiring Secure Access associated with the Mobile Access Point 140. The Authentication Application 300 for the Application Requiring Secure Access 140 has been previously downloaded, installed or otherwise transferred from some other computing device, platform or computer storage to the Application Requiring Secure Access associated with the Mobile Access Point 140. The Wireless Device Authentication Application 400 includes Key Generation Logic Resources 410, Secure Key Information Storage 420 and a Local Wireless Interface 430. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of a Mobile Access Point associated with the Application Requiring Secure Access 140, the Wireless Device 100 automatically detects the Mobile Access Point 140 across the wireless communications mechanism 120 via the Local Wireless Interface 430. Alternatively, when the Wireless Device 100 enters into proximity of a Mobile Access Point associated with the Application Requiring Secure Access 140, the Mobile Access Point 140 automatically detects the Wireless Device 100 across the wireless communications mechanism 120 via the Local Wireless Interface 430. The Wireless Device 100 and the Mobile Access Point 140 establish and maintain a wireless communications connection. When the user of the Wireless Device 100 attempts to access the Application Requiring Secure Access 140, the Application Requiring Secure Access 140 may automatically invoke an application access event. Alternatively, the Application Requiring Secure Access 140 may require the user of the Wireless Device 100 to manually take some action to invoke an application access event. The application access event causes the Authentication Application 300 to perform the aforementioned Wireless Device Based User Authentication within the same computing platform as the Application Requiring Secure Access. The Authentication Application 300 provides the processed Authentication Results to the Application Requiring Secure Access 140 internally. The Application Requiring Secure Access 140 may then apply the Authentication Results to allow access by the user of the Wireless Device 100, deny access to the user of the Wireless Device 100 or provide some degree of access to the user of the Wireless Device 100.

Figure 4:
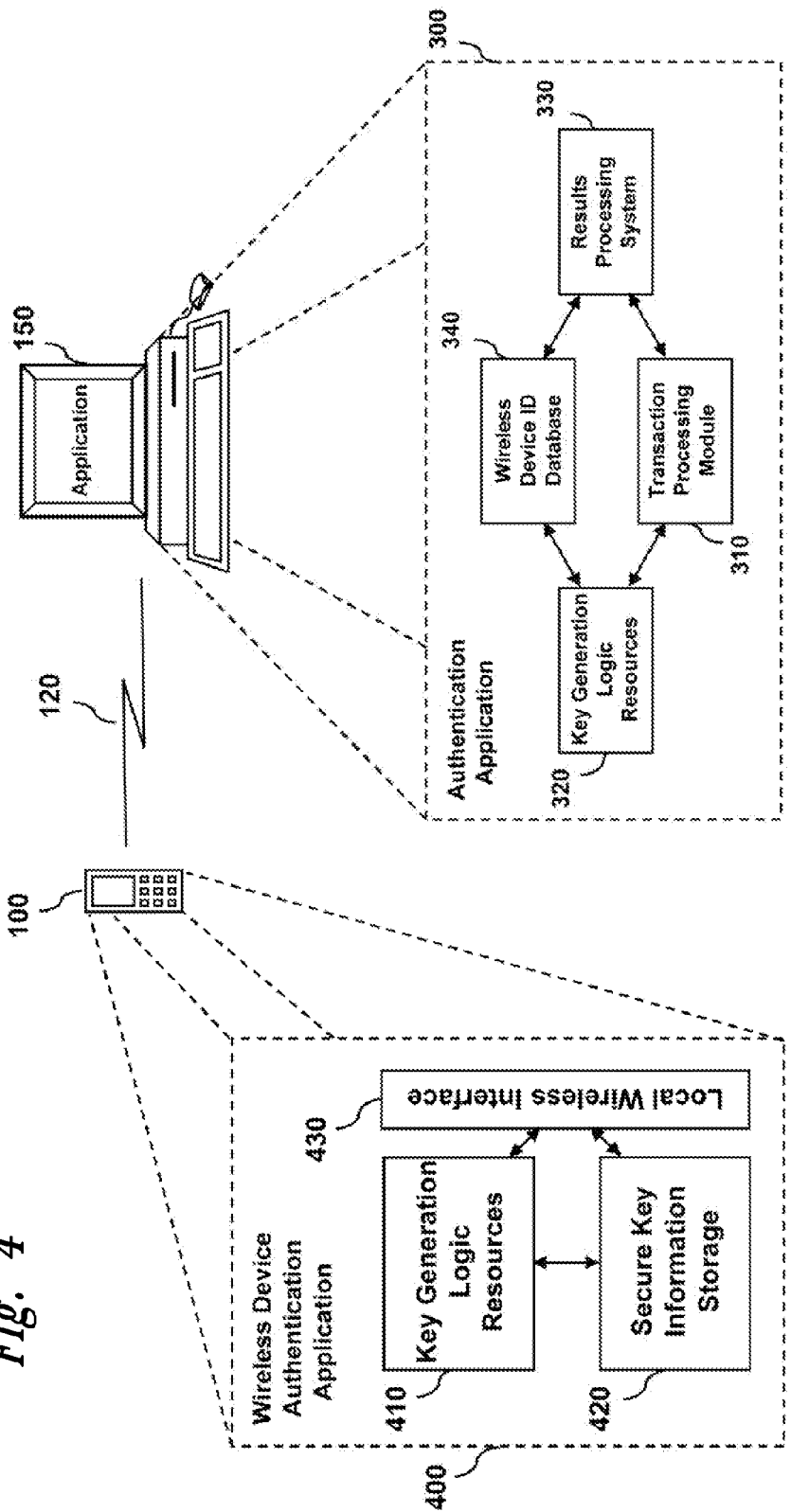
FIG. 4 depicts the functional entities and modules employed by a Wireless Device of an exemplary Wireless Device Based User Access Authentication system employing a Local Wireless Interface accessing an On-line Application (Mobile Access Point) and supported by an exemplary Wireless Device Authentication Application.

FIG. 4 depicts the use of one embodiment of a Wireless Device Based User Authentication system using a Wireless Device Based User Authentication system employing a Wireless Device Authentication Application 400 associated with, and resident on, a Wireless Device 100, a local or point-to-point short-range wireless communications mechanism 120 supporting wireless communications between the Wireless Device 100 and an Exemplary Application Requiring Secure Access associated with the Mobile Access Point 150 via a Local Wireless Interface 430 on the Wireless Device 100. The Exemplary Application Requiring Secure Access 150 is resident on a personal computer. The Authentication Application 300 for the Exemplary Application Requiring Secure Access 150 has been previously downloaded, installed or otherwise transferred from some other computing device, platform or computer storage to the Exemplary Application Requiring Secure Access associated with the Mobile Access Point 150 resident on the personal computer. The Wireless Device Authentication Application 400 includes Key Generation Logic Resources 410, Secure Key Information Storage 420 and a Local Wireless Interface 430. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of the Mobile Access Point associated with the Exemplary Application Requiring Secure Access 150 on the personal computer, the Wireless Device 100 automatically detects the Mobile Access Point 150 across the wireless communications mechanism 120 via the Local Wireless Interface 430. Alternatively, when the Wireless Device 100 enters into proximity of the Mobile Access Point associated with the Exemplary Application Requiring Secure Access 150, the Mobile Access Point 150 automatically detects the Wireless Device 100 across the wireless communications mechanism 120 via the Local Wireless Interface 430. The Wireless Device 100 and the Mobile Access Point 150 establish and maintain a wireless communications connection. When the user of the Wireless Device 100 attempts to access the Exemplary Application Requiring Secure Access 150, the Exemplary Application Requiring Secure Access 150 may automatically invoke an application access event. Alternatively, the Exemplary Application Requiring Secure Access 150 may require the user of the Wireless Device 100 to manually take some action to invoke an application access event. The application access event causes the Authentication Application 300 to perform the aforementioned Wireless Device Based User Authentication within the same computing platform as the Exemplary Application Requiring Secure Access 150. The Authentication Application 300 provides the processed Authentication Results to the Exemplary Application Requiring Secure Access 150 internally. The Exemplary Application Requiring Secure Access 150 may then apply the Authentication Results to allow access by the user of the Wireless Device 100, deny access to the user of the Wireless Device 100 or provide some degree of access to the user of the Wireless Device 100.

Figure 5:
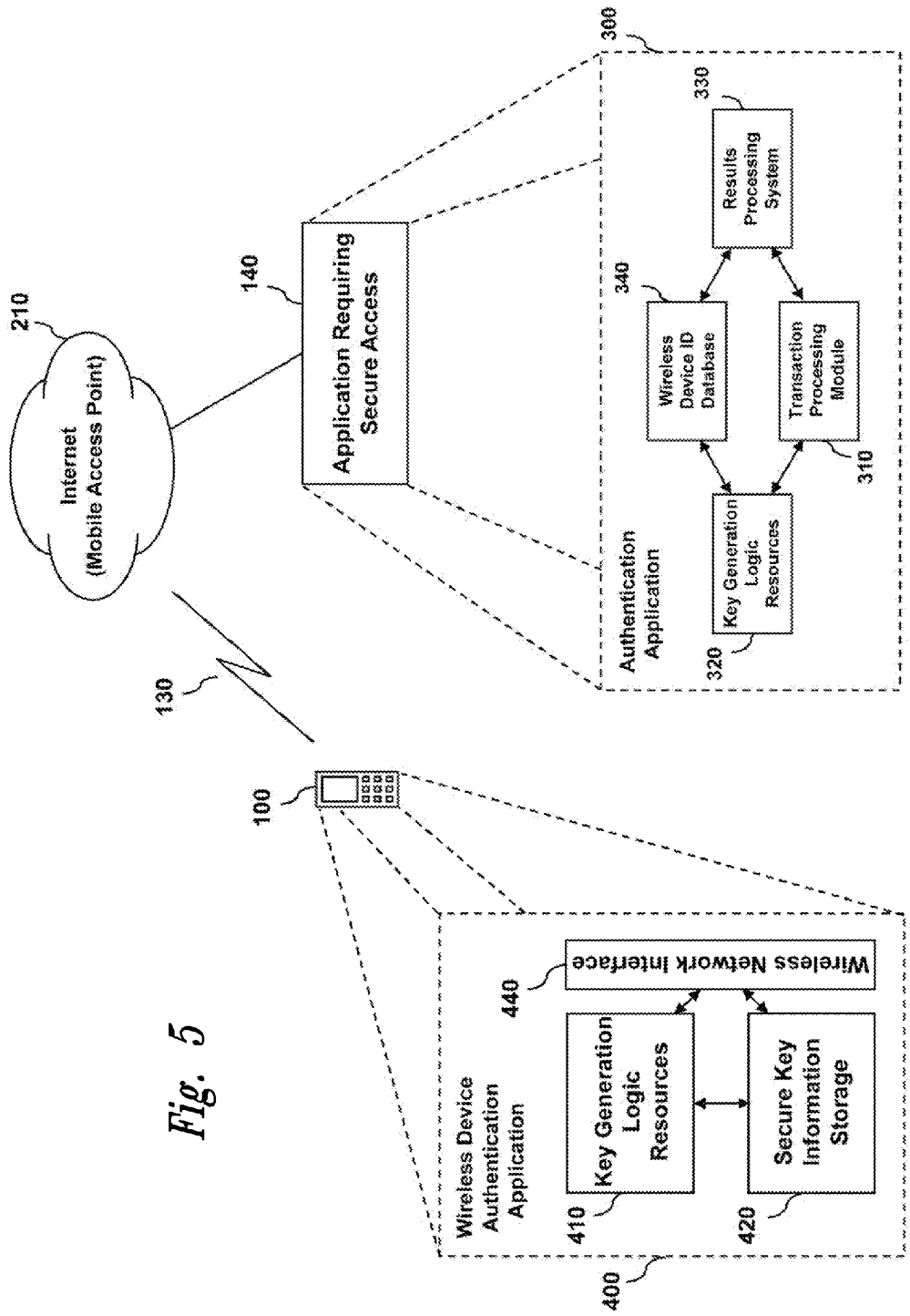
FIG. 5 depicts the functional entities and modules employed by a Wireless Device of an exemplary Wireless Device Based User Access Authentication system. Included in the example is an exemplary Wireless Device Authentication Application employing a Network Wireless Interface, one or more Key Generation Logic Resources and Secure Key Information Storage communicating with an Application Requiring Secure Access (Mobile Access Point) in accordance with the principles of the present invention.

FIG. 5 depicts one embodiment of a Wireless Device Based User Authentication system employing a Wireless Device Authentication Application 400 associated with, and resident on, a Wireless Device 100, a network long-range wireless Internet communications mechanism 130 supporting wireless communications between the Wireless Device 100 and an Application Requiring Secure Access 140 via a Wireless Network Interface 430 on the Wireless Device 100. In this embodiment of the present invention, an Authentication Application 300 is resident with the Application Requiring Secure Access 140. The Mobile Access Point is associated with the Internet 210. The Authentication Application 300 for the Application Requiring Secure Access 140 has been previously downloaded, installed or otherwise transferred from some other computing device, platform or computer storage to the Application Requiring Secure Access 140. The Wireless Device Authentication Application 400 includes Key Generation Logic Resources 410, Secure Key Information Storage 420 and a Local Wireless Interface 440. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of the Mobile Access Point 210, for example within a range of up to approximately 100 meters if Bluetooth wireless technology is used, the Wireless Device 100 automatically detects the Mobile Access Point 210 across the wireless network communications mechanism 130 via the Wireless Network Interface 440. Alternatively, when the Wireless Device 100 enters into proximity of the Mobile Access Point 210, the Mobile Access Point 210 automatically detects the Wireless Device 100 across the wireless network communications mechanism 130 via the Wireless Network Interface 440. The Wireless Device 100 and the Mobile Access Point 210 establish and maintain a wireless communications connection. When the user of the Wireless Device 100 attempts to access the Application Requiring Secure Access 140, the Application Requiring Secure Access 140 may automatically invoke an application access event. Alternatively, the Application Requiring Secure Access 140 may require the user of the Wireless Device 100 to manually take some action to invoke an application access event. The application access event causes the Authentication Application 300 to perform the aforementioned Wireless Device Based User Authentication within the same computing platform as the Application Requiring Secure Access. The Authentication Application 300 provides the processed Authentication Results to the Application Requiring Secure Access 140 internally. The Application Requiring Secure Access 140 may then apply the Authentication Results to allow access by the user of the Wireless Device 100, deny access to the user of the Wireless Device 100 or provide some degree of access to the user of the Wireless Device 100.

Figure 6:
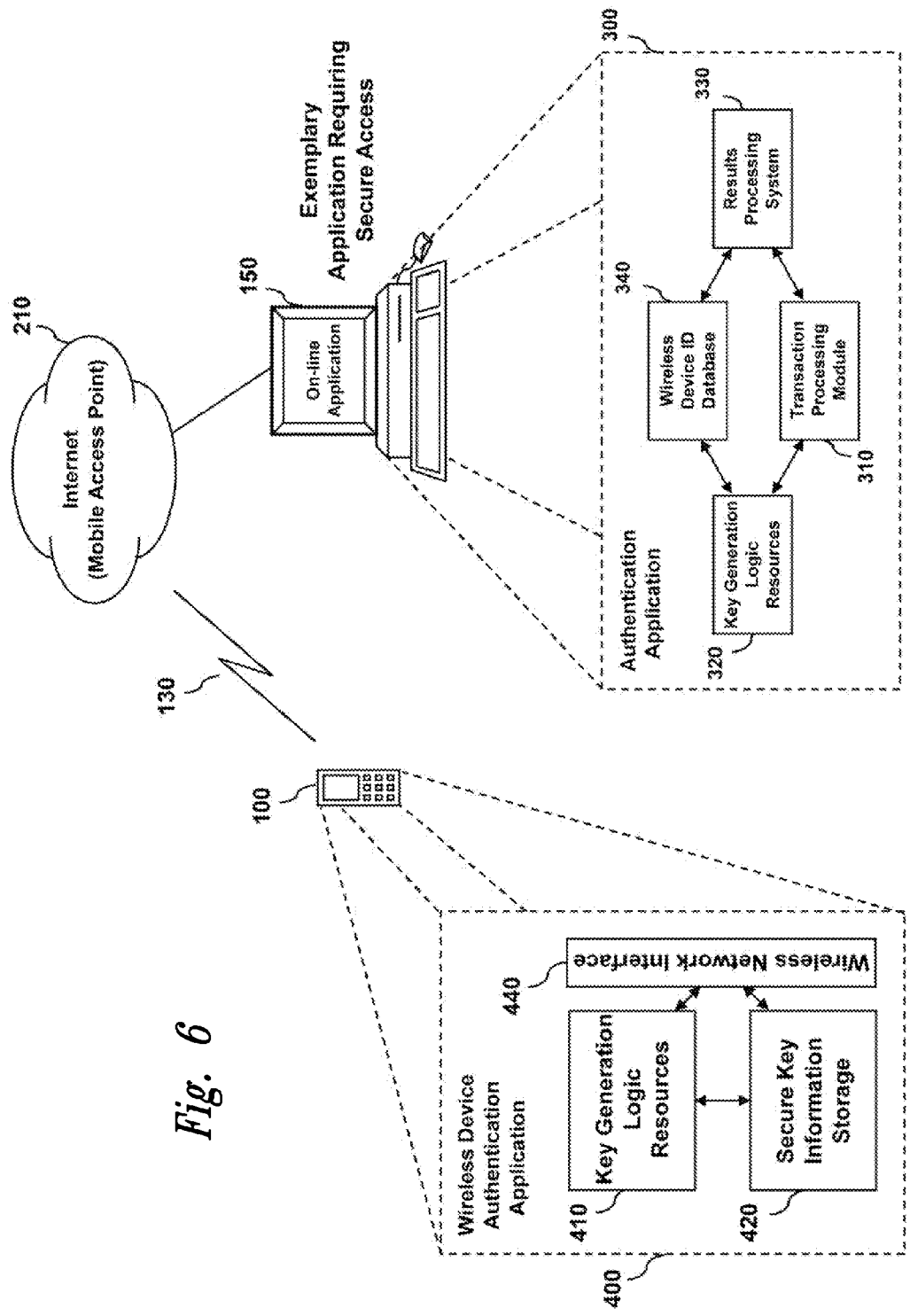
FIG. 6 depicts the functional entities and modules employed by a Wireless Device of an exemplary Wireless Device Based User Access Authentication system employing a Network Wireless Interface accessing an On-line Application (Mobile Access Point) and supported by an exemplary Wireless Device Authentication Application.

FIG. 6 depicts one embodiment of a Wireless Device Based User Authentication system employing a Wireless Device Authentication Application 400 associated with, and resident on, a Wireless Device 100, a network long-range wireless Internet communications mechanism 130 supporting wireless communications between the Wireless Device 100 and an Exemplary On-line Application Requiring Secure Access 150 on a personal computer via a Wireless Network Interface 440 on the Wireless Device 100. In this embodiment of the present invention, an Authentication Application 300 is resident with the Exemplary On-line Application Requiring Secure Access 150 on the personal computer. The Mobile Access Point is associated with the Internet 210. The Authentication Application 300 for the Exemplary On-line Application Requiring Secure Access 150 has been previously downloaded, installed or otherwise transferred from some other computing device, platform or computer storage to the Exemplary On-line Application Requiring Secure Access 150. The Wireless Device Authentication Application 400 includes Key Generation Logic Resources 410, Secure Key Information Storage 420 and a Local Wireless Interface 440. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of the Mobile Access Point 210, for example within a range of up to approximately 100 meters if Bluetooth wireless technology is used, the Wireless Device 100 automatically detects the Mobile Access Point 210 across the wireless network communications mechanism 130 via the Wireless Network Interface 440. Alternatively, when the Wireless Device 100 enters into proximity of the Mobile Access Point 210, the Mobile Access Point 210 automatically detects the Wireless Device 100 across the wireless network communications mechanism 130 via the Wireless Network Interface 440. The Wireless Device 100 and the Mobile Access Point 210 establish and maintain a wireless communications connection. When the user of the Wireless Device 100 attempts to access the Exemplary On-line Application Requiring Secure Access 150, the Exemplary On-line Application Requiring Secure Access 150 may automatically invoke an application access event. Alternatively, the Exemplary On-line Application Requiring Secure Access 150 may require the user of the Wireless Device 100 to manually take some action to invoke an application access event. The application access event causes the Authentication Application 300 to perform the aforementioned Wireless Device Based User Authentication within the same computing platform as the Application Requiring Secure Access. The Authentication Application 300 provides the processed Authentication Results to the Exemplary On-line Application Requiring Secure Access 150 internally. The Application Requiring Secure Access 150 may then apply the Authentication Results to allow access by the user of the Wireless Device 100, deny access to the user of the Wireless Device 100 or provide some degree of access to the user of the Wireless Device 100.

FIG. 7 depicts exemplary entries in an exemplary Wireless Device ID Database 340 shown in FIGS. 1, 2, 3, 4, 5 and 6. In particular, as depicted in FIG. 7, a first entry 346 includes an association among an individual's Wireless Device ID 341 (e.g. in this case an MDN), Authentication Key Information 342, the Location of the Application Access Event 343, the date and time the Location of the Application Access Event was obtained 344 and Authentication Results 345. The Wireless Device ID is used by the exemplary Wireless Device ID Database 340 in FIGS. 1, 2, 3, 4, 5 and 6. The Wireless Device ID may be used as the primary parameter used to associate data from the Wireless Device ID Database 340 in FIGS. 1, 2, 3, 4, 5 and 6 to be used by the Results Processing System 330 in FIGS. 1, 2, 3, 4, 5 and 6 to generate Authentication Results 345. The entry for the individual's Authentication Key Information 342 may be provided directly by the Key Generation Logic Resources 320 in FIGS. 1, 2, 3, 4, 5 and 6 or may be populated via some other method such as by downloading, installing or otherwise transferring from some other computing device, platform or computer storage during some registration process. The entries for Authentication Key Information 342 represent unique data in a multiplicity of formats that corresponds with Authentication Key Information stored in Secure Key Information Storage 420 associated with a Wireless Device Authentication Application 400 resident with a Wireless Device 100 shown in FIGS. 1, 2, 3, 4, 5 and 6 and identified by the Wireless Device ID 341. The entries for Location of the Application Access Event 343 may be in a multiplicity of formats and may be pre-populated and resolved for the obtained Location of the Application Access Event 343 or otherwise derived based upon known mapping information within the database. Non-limiting examples of the Location of the Application Access Event 343 value obtained via the Mobile Access Point FIGS. 1, 140 and 200 and FIGS. 2, 150 and 210 may be a Geographic Name, an identifier (ID) associated with a Mobile Access Point FIGS. 1, 140 and 200 and FIGS. 2, 150 and 210, an Address such as a street number, name, city, state, county, postal code or country, or may be of the format of a network address such as an Internet Protocol (IP) address in the form of XX.XX.XX.XX or some other network address format, latitude or longitude coordinates or any other projection coordinates that may be associated with a geographic place that facilitates the generation of Authentication Results 345 by the Results Processing System 330 in FIGS. 1, 2, 3, 4, 5 and 6. The Date and Time 344 entries may, for example, represent a date and time of a particular obtained and corresponding Location of an Application Access Event 343 or Wireless Device location 330 in FIGS. 1, 2, 3, 4, 5 and 6 to assist in determining, for example, corresponding Authentication Results 345. The Authentication Results 345 contains entries in the database that associate a particular Application ID associated with an Application Requiring Secure Access 140 in FIGS. 1, 3 and 5 and 150 in FIGS. 2, 4 and 6 received along with other related application access event data for the particular application access event. The Results Value 345 for the associated Wireless Device ID 341 is generated based on the application access event data and the associated and corresponding Authentication Key Information 342 due to the application access event.

Figure 8:
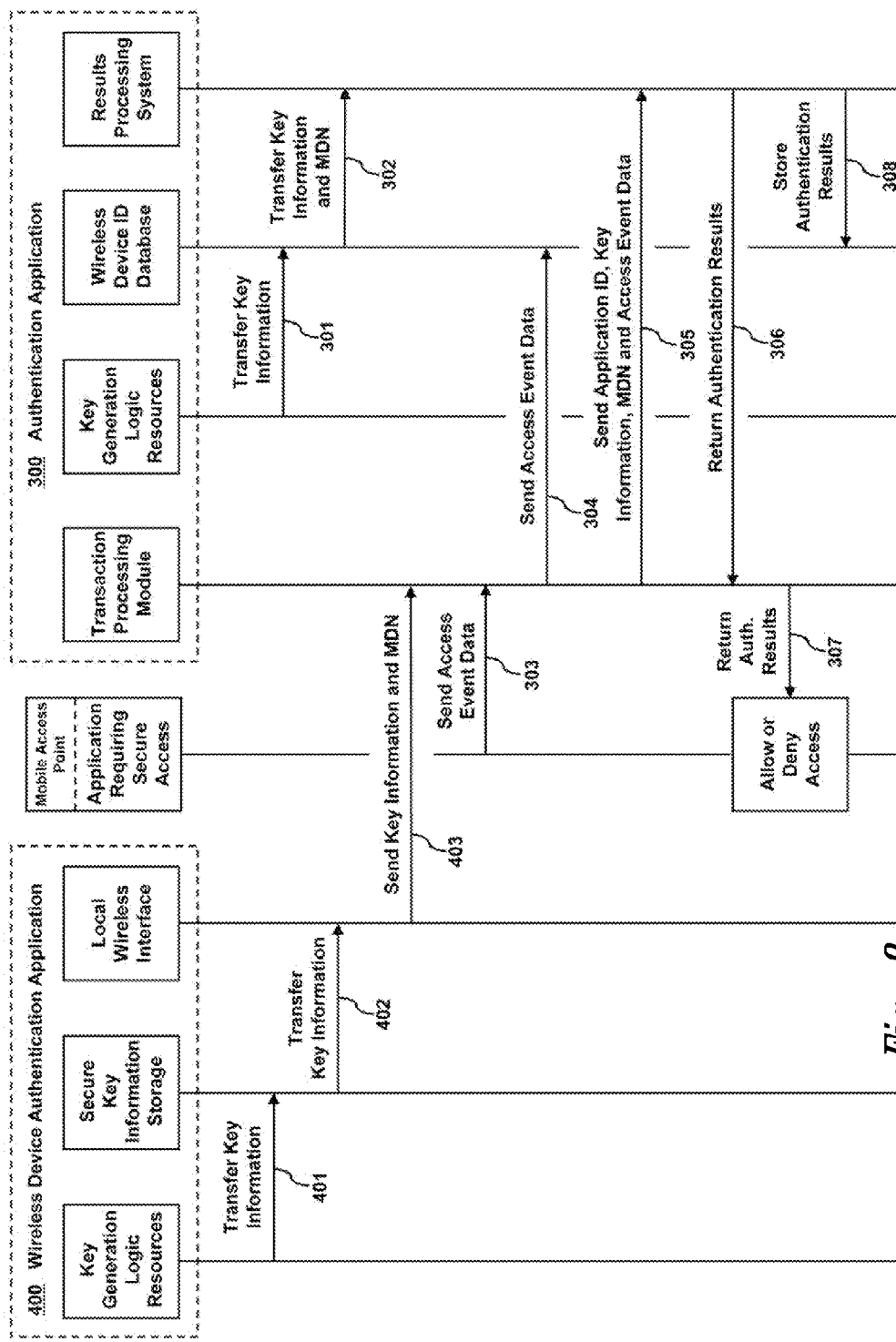
FIG. 8 depicts an exemplary information flow diagram of a Wireless Device Based User Authentication system.

FIG. 8 is a non-limiting and exemplary detailed information and system flow diagram representing the operation of a Wireless Device Based User Authentication system, in accordance with one embodiment of the present invention. In this exemplary information and system flow, an entity or individual may initially invoke either manually or automatically some transaction or application access attempt resulting in an application access event that causes Wireless Device Based User Authentication to occur in accordance with the principles of the present invention.

Step 401: In the Wireless Device and associated with the Wireless Device Authentication Application 400, Authentication Key Information has been previously generated by Key Generation Logic and is transferred to Secure Key Information Storage. Alternatively, Authentication Key Information may be downloaded to, previously installed or otherwise transferred to the Wireless Device Authentication Application 400 from some other computing device, platform or computer storage and stored in Secure Key Information Storage.

Step 402: When some application access event occurs, Authentication Key Information is transferred to the Local Wireless Interface of the Wireless Device and associated with the Wireless Device Authentication Application 400. The application access event may cause the Authentication Key Information to be autonomously sent from Secure Key Information Storage to the Local Wireless Interface or otherwise be requested from Secure Key Information Storage.

Step 403: Authentication Key Information and optionally the Wireless Device ID, in this case in the form of an MDN, is sent either to directly to the Transaction Processing Module of the Authentication Application 300 or may be sent indirectly to the Transaction Processing Module of the Authentication Application 300 via the Application Requiring Secure Access and associated with a Mobile Access Point. In this case, the Authentication Key Information and optionally the MDN are sent directly to the Transaction Processing Module of the Authentication Application 300.

Step 301: In the Authentication Application 300, Authentication Key Information has been previously generated by Key Generation Logic and is transferred to the Wireless Device ID Database. Alternatively, Authentication Key Information may be downloaded to, previously installed or otherwise transferred to the Authentication Application 300 from some other computing device, platform or computer storage and stored in the Wireless Device ID Database.

Step 302: When some application access event occurs, Authentication Key Information is transferred to the Results Processing System of the Authentication Application 300.

Step 303: Either the Application Requiring Secure Access or the Mobile Access Point sends application access event data to the Transaction Processing Module of the Authentication Application 300. Examples of the application access event data are the Application ID, Location of the Application Access Event and the date and time the Location of the Application Access Event was obtained.

Step 304: The Transaction Processing Module sends the previously accumulated and appropriate application access event data associated with the particular application access attempt by the particular Wireless Device user to the Wireless Device ID Database for storage, for example, the Application ID, the Location of the Application Requiring Secure Access and the date and time of the Application Access Event.

Step 305: The Transaction Processing Module sends the previously accumulated Application ID, Authentication Key Information, MDN and other related access event data to the Results Processing System to generate Authentication Results for the particular application access attempt.

Step 306: When the Authentication Results are generated, the Results Processing System returns them to the Transaction Processing Module for subsequent delivery to the Application Requiring Secure Access.

Step 307: The Transaction Processing Module returns the Authentication Results to the Application Requiring Secure Access. The Application Requiring Secure Access may then apply the received Authentication Results to the application access attempt and determine whether to allow access, deny access or otherwise provide some degree of access to the Application Requiring Secure Access for the Wireless Device user.

Step 308: The Results Processing System stores the appropriate Authentication Results for the concerned Application ID in the Wireless Device ID Database for the corresponding Wireless Device ID representing the user.

Figure 9:
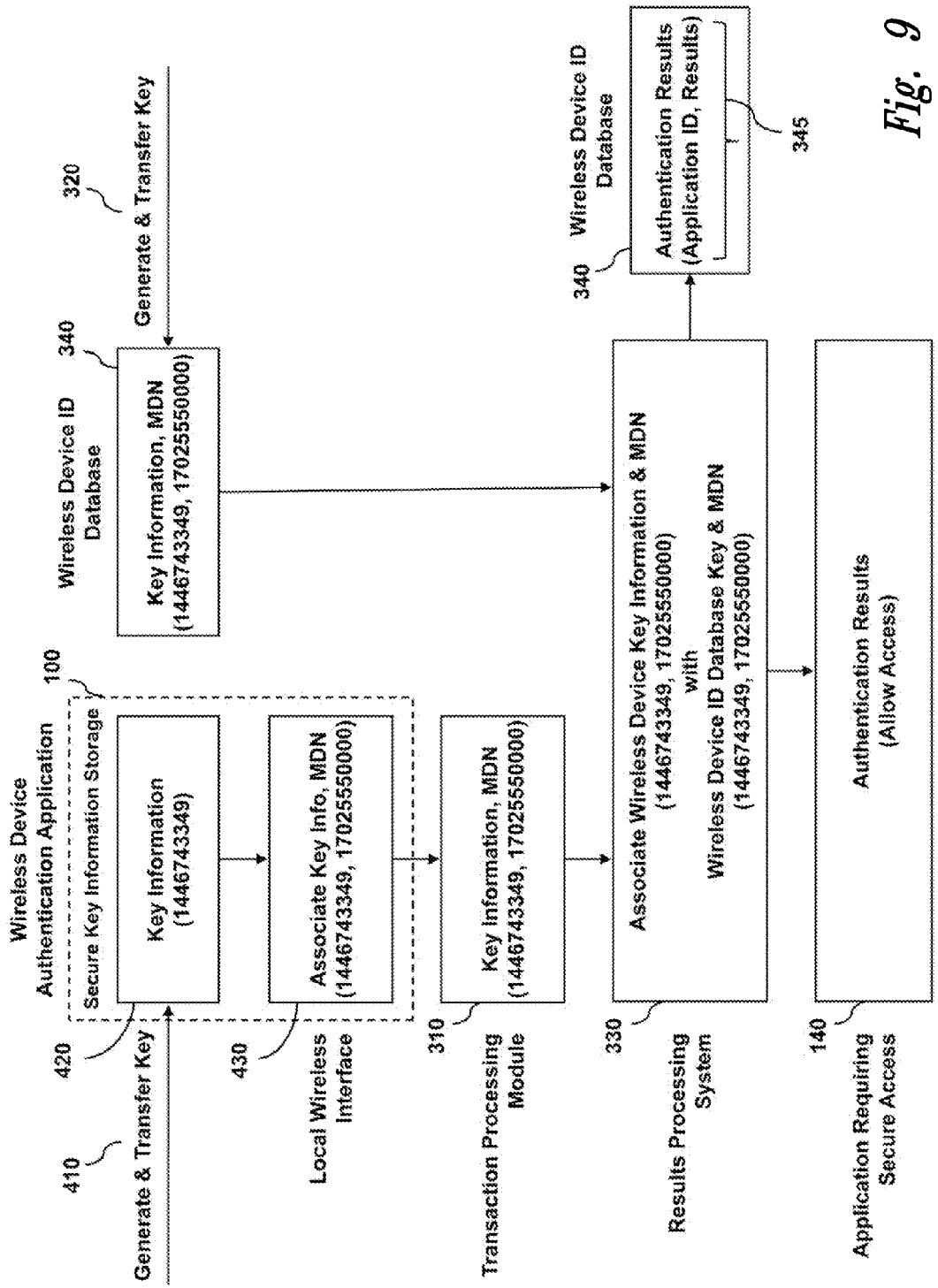
FIG. 9 depicts an exemplary process flow diagram of a Wireless Device Based User Authentication system resulting in a successful authentication process where access is allowed.

FIG. 9 is an exemplary detailed process flow diagram representing the operation of a Wireless Device Based User Authentication system resulting in a successful Authentication Result. In this exemplary process flow, an entity or individual may initially invoke either manually or automatically some transaction or application access attempt resulting in an application access event that causes Wireless Device Based User Authentication to occur in accordance with the principles of the present invention. Authentication Key Information has been previously generated by Key Generation Logic and is transferred 410 to Secure Key Information Storage 420 associated with the Wireless Device Authentication Application. Alternatively, Authentication Key Information may be downloaded to, previously installed or otherwise transferred to the Wireless Device Authentication Application from some other computing device, platform or computer storage and stored in Secure Key Information Storage 420. In this exemplary case, the value of the Authentication Key Information is a ten-digit string of numbers "1446743349." Authentication Key Information has been previously generated by Key Generation Logic and is transferred 320 to the Wireless Device ID Database 340 associated with the Authentication Application. Alternatively, Authentication Key Information may be downloaded to, previously installed or otherwise transferred to the Wireless Device ID Database from some other computing device, platform or computer storage and stored in the Wireless Device ID Database 340. In this exemplary case, the value of the Authentication Key Information is a ten-digit string of numbers "1446743349." In the Wireless Device Authentication Application, the Authentication Key Information "1446743349" is associated with the Wireless Device ID, in this exemplary case, the MDN value "17025550000" for the Local Wireless Interface 430. Similarly, the Authentication Key Information "1446743349" is associated with the Wireless Device ID, in this exemplary case, the MDN value "17025550000" in the Wireless Device ID Database 340. The Authentication Key Information and MDN of the Wireless Device and associated with the Wireless Device Authentication Application 400 are sent to the Transaction Processing Module 310 of the Authentication Application. The Authentication Key Information and MDN are sent from the Transaction Processing Module 310 to the Results Processing System 330. Similarly, the Authentication Key Information and MDN from the Wireless Device ID Database 340 and associated with the Authentication Application are sent to the Results Processing System 330 of the Authentication Application. The Results Processing System 330 associates the Authentication Key Information and MDN, in this case the values "1446743349" and "17025550000," respectively, obtained from the Wireless Device Authentication Application 400, with the Authentication Key Information and MDN, in this case the values "1446743349" and "17025550000," respectively, obtained from the Wireless Device ID Database 340. The Results Processing System 330 generates a successful Authentication Result as the respective values for both Authentication Key Information parameters and both MDN parameters correspond, and in this exemplary case, match. The Results Processing System 330 then returns the Authentication Results to the Application Requiring Secure Access 140 enabling the Application Requiring Secure Access 140 to allow access to the user of the Wireless Device. The Results Processing System 330 also stores the Authentication Results 345 in the form of an Application ID and a successful Result to the Wireless Device ID Database of the Authentication Application.

Figure 10:
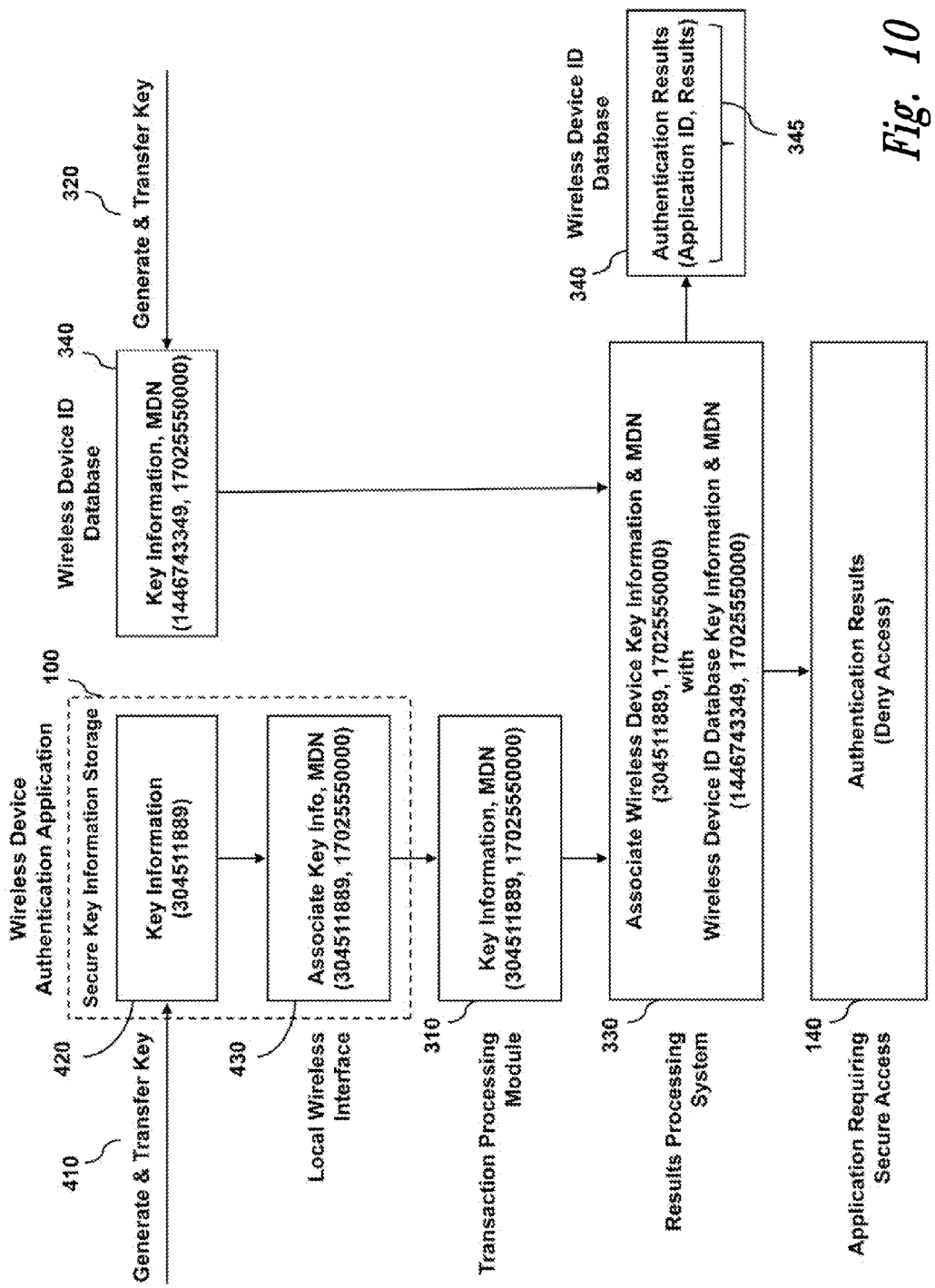
FIG. 10 depicts an exemplary process flow diagram of a Wireless Device Based User Authentication system resulting in an unsuccessful authentication process where access is denied.

FIG. 10 is an exemplary detailed process flow diagram representing the operation of a Wireless Device Based User Authentication system resulting in an unsuccessful Authentication Result. In this exemplary process flow, an entity or individual may initially invoke either manually or automatically some transaction or application access attempt resulting in an application access event that causes Wireless Device Based User Authentication to occur in accordance with the principles of the present invention. Authentication Key Information has been previously generated by Key Generation Logic and is transferred 410 to Secure Key Information Storage 420 associated with the Wireless Device Authentication Application. Alternatively, Authentication Key Information may be downloaded to, previously installed or otherwise transferred to the Wireless Device Authentication Application from some other computing device, platform or computer storage and stored in Secure Key Information Storage 420. In this exemplary case, the value of the Authentication Key Information is a ten-digit string of numbers "304511889." Authentication Key Information has been previously generated by Key Generation Logic and is transferred 320 to the Wireless Device ID Database 340 associated with the Authentication Application. Alternatively, Authentication Key Information may be downloaded to, previously installed or otherwise transferred to the Wireless Device ID Database from some other computing device, platform or computer storage and stored in the Wireless Device ID Database 340. In this exemplary case, the value of the Authentication Key Information is a ten-digit string of numbers "1446743349." In the Wireless Device Authentication Application, the Authentication Key Information "1446743349" is associated with the Wireless Device ID, in this exemplary case, the MDN value "17025550000" for the Local Wireless Interface 430. Similarly, the Authentication Key Information "1446743349" is associated with the Wireless Device ID, in this exemplary case, the MDN value "17025550000" in the Wireless Device ID Database 340. The Authentication Key Information and MDN of the Wireless Device and associated with the Wireless Device Authentication Application 400 are sent to the Transaction Processing Module 310 of the Authentication Application. The Authentication Key Information and MDN are sent from the Transaction Processing Module 310 to the Results Processing System 330. Similarly, the Authentication Key Information and MDN from the Wireless Device ID Database 340 and associated with the Authentication Application are sent to the Results Processing System 330 of the Authentication Application. The Results Processing System 330 associates the Authentication Key Information and MDN, in this case the values "304511889" and "17025550000," respectively, obtained from the Wireless Device Authentication Application 400, with the Authentication Key Information and MDN, in this case the values "1446743349" and "17025550000," respectively, obtained from the Wireless Device ID Database 340. The Results Processing System 330 generates an unsuccessful Authentication Result as the respective values for the Authentication Key Information parameters do not correspond, and in this exemplary case, do not match. The Results Processing System 330 then returns the Authentication Results to the Application Requiring Secure Access 140 enabling the Application Requiring Secure Access 140 to deny access to the user of the Wireless Device. The Results Processing System 330 also stores the Authentication Results 345 in the form of an Application ID and an unsuccessful Result to the Wireless Device ID Database of the Authentication Application.

Figure 11:
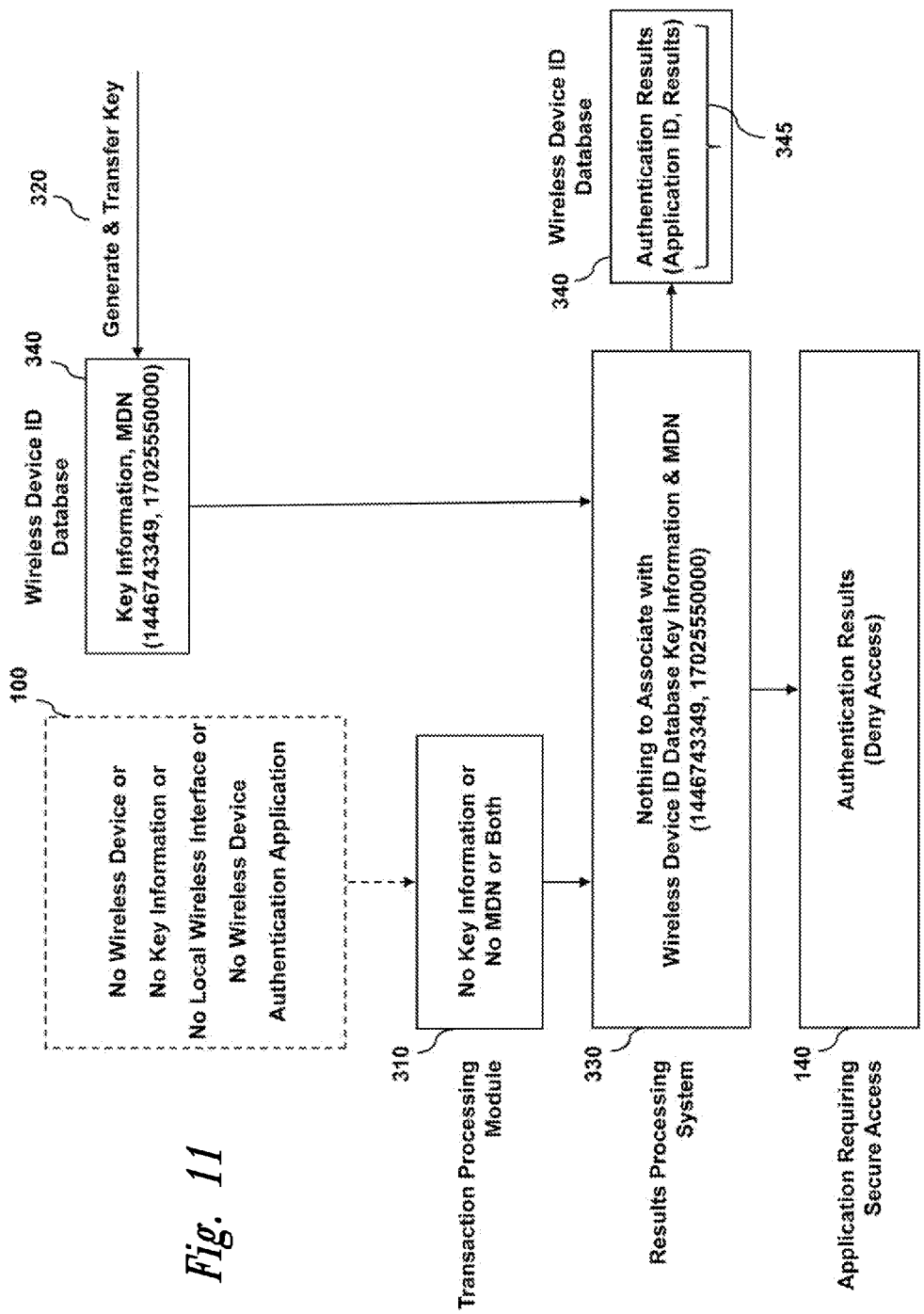
FIG. 11 depicts an exemplary process flow diagram of a Wireless Device Based User Authentication system resulting in an unsuccessful authentication process where access is denied due to the lack of presence of an enabled Wireless Device Authentication Application.

FIG. 11 is an exemplary detailed process flow diagram representing the operation of a Wireless Device Based User Authentication system resulting in an unsuccessful Authentication Result due to the lack of presence of a Wireless Device 100, or lack of presence of Wireless Device Key Information or lack of presence of a Wireless Device Authentication Application. In this exemplary process flow, an entity or individual may initially invoke either manually or automatically some transaction or application access attempt resulting in an application access event that causes Wireless Device Based User Authentication to occur in accordance with the principles of the present invention. Authentication Key Information has been previously generated by Key Generation Logic and is transferred 320 to the Wireless Device ID Database 340 associated with the Authentication Application. Alternatively, Authentication Key Information may be downloaded to, previously installed or otherwise transferred to the Wireless Device ID Database from some other computing device, platform or computer storage and stored in the Wireless Device ID Database 340. In this exemplary case, the value of the Authentication Key Information is a ten-digit string of numbers "1446743349." In this exemplary case, there is no Wireless Device 100, or if there is a Wireless Device 100, no Wireless Device Authentication Key Information exists or no Local Wireless Interface exists, or is detected, or no Wireless Device Authentication Application exists. Due to this circumstance, no Authentication Key Information and no Wireless Device ID (i.e. the MDN) is sent to the Authentication Application. The Authentication Key Information and MDN from the Wireless Device ID Database 340 and associated with the Authentication Application are sent to the Results Processing System 330 of the Authentication Application. The Results Processing System 330 attempts to associate the Authentication Key Information and MDN, in this case the values "1446743349" and "17025550000," respectively, obtained from the Authentication Application with the Authentication Key Information and MDN obtained from the Wireless Device Authentication Application. As this information does not exist, the Results Processing System 330 generates an unsuccessful Authentication Result as the respective values for the Authentication Key Information parameters do not correspond, and in this exemplary case, the information required from the Wireless Device does not exist. The Results Processing System 330 then returns the Authentication Results to the Application Requiring Secure Access 140 enabling the Application Requiring Secure Access 140 to deny access to the user of the Wireless Device. The Results Processing System 330 also stores the Authentication Results 345 in the form of an Application ID and an unsuccessful Result to the Wireless Device ID Database of the Authentication Application.

Figure 12:
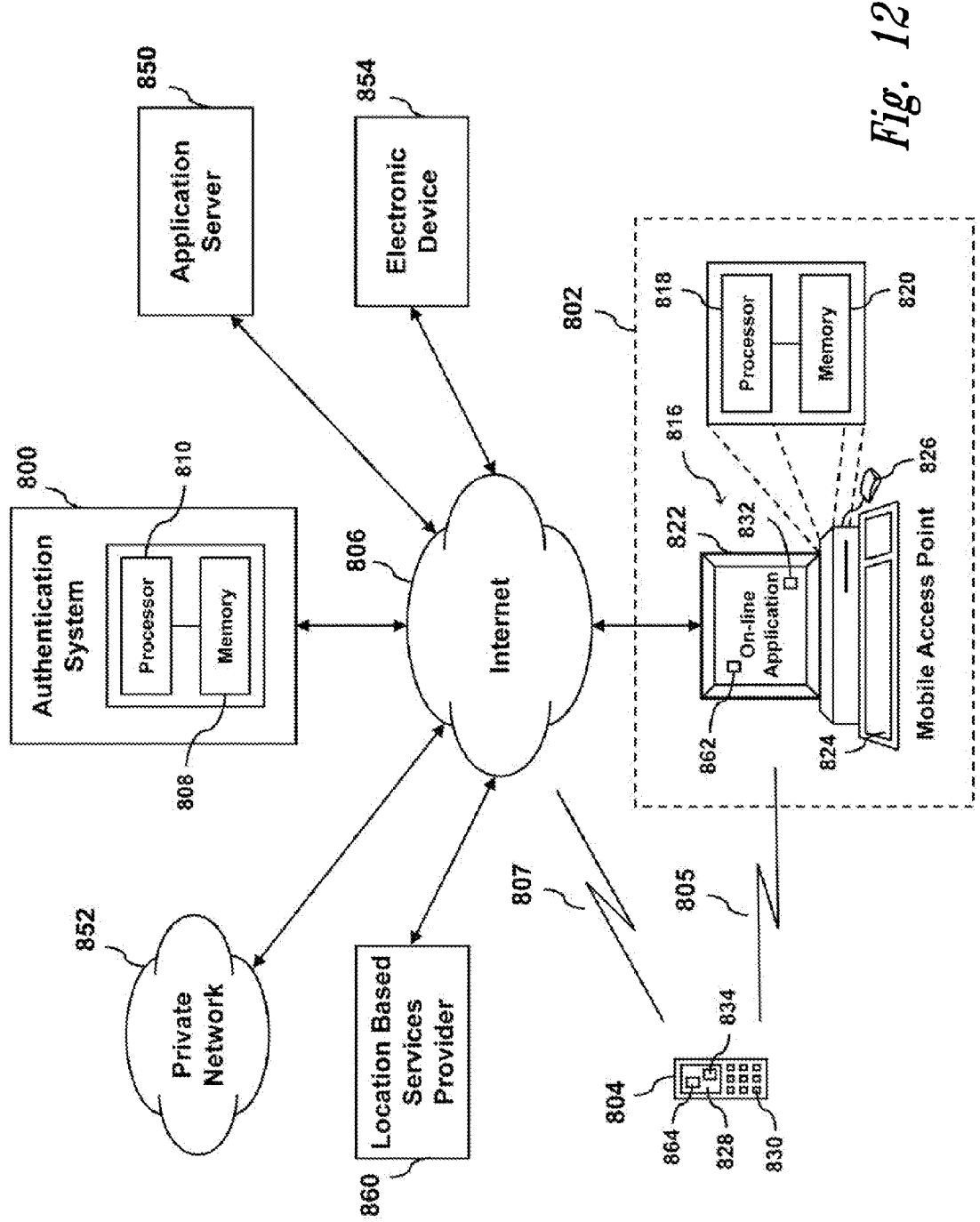
FIG. 12 is a diagram of a system for authenticating a user of an application requiring secure access based on activation of an invocation element by a single action of the user.

FIG. 12 is a diagram of a preferred embodiment of a system 800 for authenticating a user of an application requiring secure access to the application using a mobile access point 802 in data communication with the application and a wireless device 804 associated with the user. The user is a previously registered user of the application in an example embodiment, but the system 800 is also configured to register the user in some embodiments, such as by prompting the user for registration information if they have not been previously registered before allowing the user to proceed.

The system 800 is in data communication with the mobile access point 802 through a computer network 806 such as the internet. The computer network 806 is alternatively structured as a mobile access point such as the mobile access point 210 shown in FIG. 2, in some embodiments. The wireless device 804 is in signal communication with the mobile access point 802 over a first communications link 805. The first communications link 805 is a short-range wireless connection such as Bluetooth in an example embodiment. However, other communications mechanisms may also be used for the first communications link 805, including a wired communications link. The wireless device 804 is also in signal communication with other components using a second communications link 807. The second communications link 807 can be a long-range wireless communications mechanism such as a cellular wireless communication network provided by a wireless network services provider. The second communications link 807 can also use other communications mechanisms in some embodiments, such as by connecting to the internet 806 using an access point of a WiFi network. The system 800 includes a memory 808 in data communication with a processor 810. In the preferred embodiment shown, the mobile access point 802 includes a computer 816 having a processor 818 in data communication with a memory 820, a display 822, and user input devices that include a keyboard 824 and mouse 826. The wireless device 804 includes a display 828 and a user interface 830 that allows for user input. Although not shown for clarity, the wireless device 804 also includes a processor, memory, and at least one radio frequency communications device such as a transceiver, for example.

The processor 810 is configured to provide an invocation element capable of being activated by a single user action on at least one of the wireless device 804 and the mobile access point 802. When provided to the mobile access point 802, the invocation element is preferably presented on the display 822, such as by displaying an authentication button 832. In similar fashion, when provided to the wireless device 804, the invocation element is preferably presented on the display 828, such as by displaying a wireless device authentication button 834. In the example shown, the authentication system 800 communicates with the wireless device 804 using the internet 806. However, it should be understood that the authentication system 800 may communicate with the wireless device 804 in a different manner in other embodiments such as by also sending information to a wireless service provider that uses a wireless service network including a base station to communicate with the wireless device 804.

The application requiring secure access can be an actual application, such as a computer application hosted on an application server 850. However, the application requiring secure access can also take other forms, such as a private network 852 or an electronic device 854, for example. The application requiring secure access may also be hosted locally on the mobile access point 802 in some embodiments. In the example shown, the application server 850, the private network 852, and the electronic device 854 are all in data communication with the internet 806 which allows them to be in communication with the authentication system 800, the mobile access point 802, and/or the wireless device 804.

The user activates the authentication button 832 with the keyboard 824 or the mouse 826. In similar fashion, the user may activate the wireless device authentication button 834 with the user interface 830. The processor 810 of the authentication system 800 is configured to receive an indication that the invocation element such as the authentication button 832 or 834 has been activated. The processor 810 is also configured to obtain a location of the wireless device 804. In an example embodiment, the processor sends a query to a location based services provider 860 to obtain a location of the wireless device 804. However, in other embodiments, the processor 810 may query the wireless device 804 directly over the internet 806 or use some other network or provider to obtain the location. The processor 810 is configured to send the location query using the mobile directory number associated with the wireless device 804 in an example embodiment.

The processor 810 is also configured to determine whether the wireless device 804 is associated with an authorized user based on a previously registered association between a wireless device identifier associated with the wireless device 804 and an application identifier associated with the application. The mobile directory number provided by the user during a registration process is the wireless device identifier in an embodiment. The mobile directory number associated with the wireless device 804 is then used to generate a query to determine whether the mobile directory number has been previously provided and stored in association with the application identifier. If so, the user is determined to be an authorized user. If not, the use considered to not be an authorized user. Additional or alternative authorization information may also be used, such as an authentication key associated with the wireless device 804.

The processor 810 is configured to approve the user to use the application based on a predetermined location criterion related to at least one of the obtained wireless location and a location of the mobile access point 802, if the wireless device 804 is associated with an authorized user. In an example embodiment, this location criterion uses a predetermined authentication distance such that the wireless device 804 location must be within the predetermined authentication distance from the mobile access point 802 for the location criterion to be met. However, many other location criteria may also be used, such as by using probabilistic behavioral modeling that uses the location of the wireless device 804 and/or the wireless access point 802 as a factor in generating a value that represents the probability that the user is not fraudulent. Additional examples of location criteria include the use of short-range radio frequency communications such as Bluetooth between the wireless device 804 and the mobile access point 802 to establish that the wireless device 804 is within a relative proximity of the mobile access point 802, and allowing access based on the relative locations rather than physical geographic locations of the wireless 804 and the mobile access point 802. Furthermore, location criteria may be obtained by the authentication system 800, the application server 850, the electronic device 854, the private network 852 and/or the location based services provider 860 directly or indirectly from the wireless network services provider represented, for example, by the mobile access point such as the mobile access point 210 shown in FIG. 2.

The processor 810 is configured to produce an indication on at least one of the mobile access point 802 and the wireless device 804 that the user has been authenticated if the user was approved. The indication is preferably presented on the display 822 as an indicator 862 if the indication is produced on the mobile access point 802. In similar fashion, the indication is preferably presented on the display 828 as a wireless device indicator 864 if the indication is produced on the wireless device 804.

In some embodiments, the authentication system 800 is structured to include the Authentication Application 300. It should also be understood that the mobile access point 802 is not limited to the embodiment shown in FIG. 12, but can also be structured in other manners such as those described with respect to the Mobile Access Points 140, 150, 200, and 210, for example. The application requiring secure access may also be presented in a different manner, such as those described with respect to FIGS. 1-11.

Figure 13:
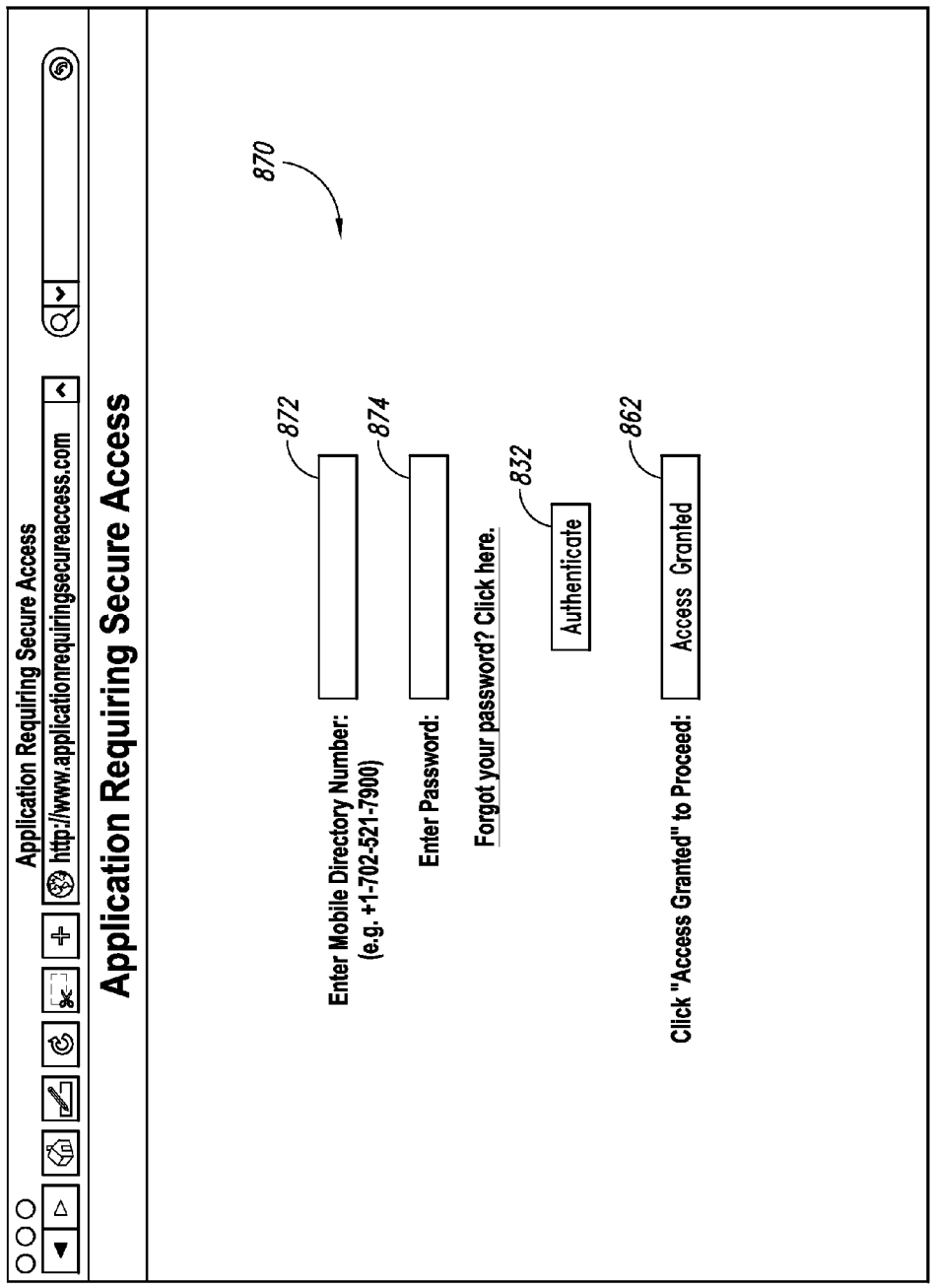
FIG. 13 is a diagram of an electronic form presented on a display by the system shown in FIG. 12.

As shown in FIG. 13, the processor 810 is configured to present the authentication button 832 as a part of an electronic form 870 during a first presentation to the user. The electronic form 870 also includes a mobile directory number field 872 and a password field 874 during the first presentation to the user. During subsequent presentations to the user, the authentication button 832 is presented as the only item on the form 870 in an example embodiment. The form 870 is presented on the display 822 in FIG. 12 in an example embodiment.

During the first presentation to the user, the processor 810 is configured to allow the authentication button 832 to be activated only after both the mobile directory number field 872 and the password field 874 have been properly filled-in. In subsequent presentations, the authentication button 832 may be the only item present, as mentioned above, and may be activated with a single action without the need for any additional information to be entered. Rather than using the mobile directory number field 872 and the password field 874, the information required by these fields may also be entered during a registration process by the user. In this case, the authentication button 832 will always be able to be activated by a single user action, even during a first presentation to the user, because any other necessary information has already been stored in an earlier registration process.

Although the indicator 862 is shown as being present on the form 870 at the same time as the authentication button 832, the authentication button may disappear from the display 822 after the authentication button 832 has been activated, such that the indicator 862 would appear alone on the screen. Although not shown for clarity, the processor 810 may also be configured to present an access denied indicator if access is not approved.

Although the authentication system 800 and the application requiring secure access are shown to be separate from the mobile access point 802, it should be understood that the authentication system 800 may not be separate from the mobile access point 802 in some embodiments. For example, in an alternative embodiment, the authentication system 800 could reside within the computer 816 in FIG. 12 and the application requiring secure access could also reside within the computer 816 in FIG. 12. It should be understood that various functions performed by the authentication system 800 may be distributed in some embodiments such that the mobile access point 802, the wireless device 804, and/or the application server 850 or other location of an application requiring secure access could be configured to perform some functions of the authentication system 800.

The authentication system 800 functions may be carried out by a computer software program product stored in one or more memory devices such as the memory 808 and the memory 820 that causes one or more processors such as the processor 810 and/or the processor 818 to carry out program instructions that implement the single action invocation of the authentication system 800 that uses a predetermined location criterion for determining whether access should be granted.

Figure 14:
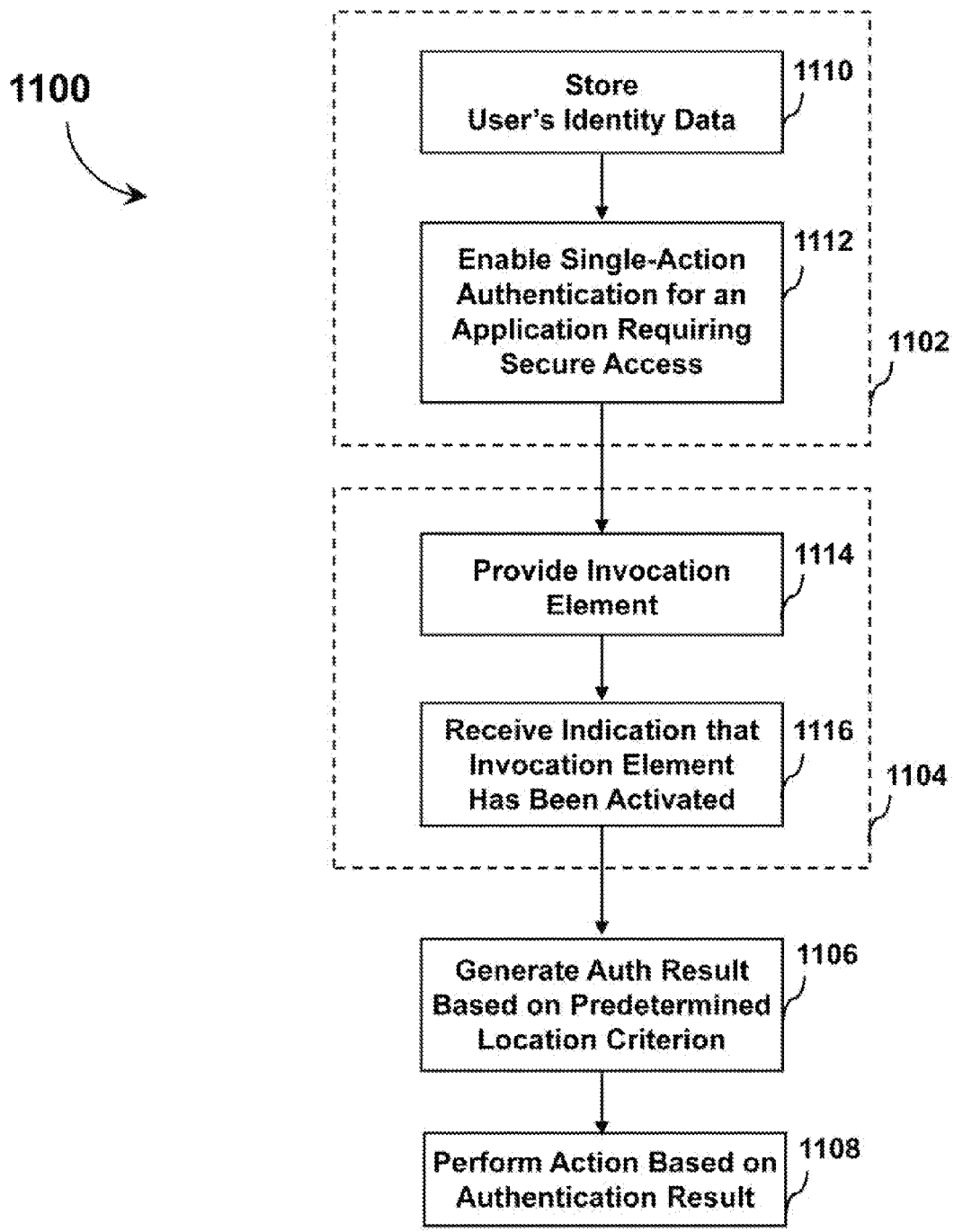
FIG. 14 is a flowchart of a method for authenticating a user of an application requiring secure access based on activation of an invocation element by a single action of the user.

FIG. 14 is a flowchart of a method 1100 for authenticating a user of an application requiring secure access to the application using a mobile access point, a computerized authentication system, and a wireless device associated with the user. In an example embodiment, the method 1100 uses the mobile access point 802, the authentication system 800, and the wireless device 804 shown in FIG. 12. The user is a previously registered user of the application in an example embodiment, but registration of the user can also occur during the method 1100 in some embodiments, such as by prompting the user for registration information if they have not been previously registered before allowing the user to proceed. The application requiring secure access is an application hosted by the application server 850 in an example embodiment, but may be other types of applications such as the private network 852 in FIG. 12 or the electronic device 854 in FIG. 12 in other embodiments.

First, at a block 1102, single-action authentication is enabled for a user of the application. Then, at a block 1104, the authentication system 800 is invoked with a single user action such as by pointing and clicking the authentication button 832 using the mouse 826. Next, at a block 1106, an authentication result is generated based on a predetermined location criterion. Then, at a block 1108, an action is performed based on the authentication result, such as presenting the indicator 862 on the display 822.

In an example embodiment, single-action authentication is enabled by storing user identity data at a block 1110 followed by enabling single-action authentication for an application requiring secure access at a block 1112. The user identity data includes a mobile directory number (MDN) associated with the wireless device 804 and may also include other information, such as a password. Enabling single-action authentication for the application requiring secure access may include storing the user identity data in association with an application identifier, for example, so that the next time the user tries to access the application, only a single action will be needed to invoke an authentication process for accessing the application.

In the example shown, the authentication system 800 is invoked by providing an invocation element at a block 1114. The invocation element can be the invocation element 832 presented on the display 822 or the wireless device invocation element 834 presented on the wireless device display 828, for example. The user would typically activate the invocation element by selecting it with a user interface device such as the keyboard 824, the mouse 826, or the user interface 830. This causes an indication to be sent from the device where the invocation element is presented to the authentication system 800. Then, at a block 1116, an indication that the invocation element has been activated is received at the system 800. In other embodiments, after invocation of the authentication system 800 by a single user action, the method 1100 proceeds according those portions of the flow diagrams shown in FIGS. 8-11 that apply after the authentication system has been invoked.

Figure 15:
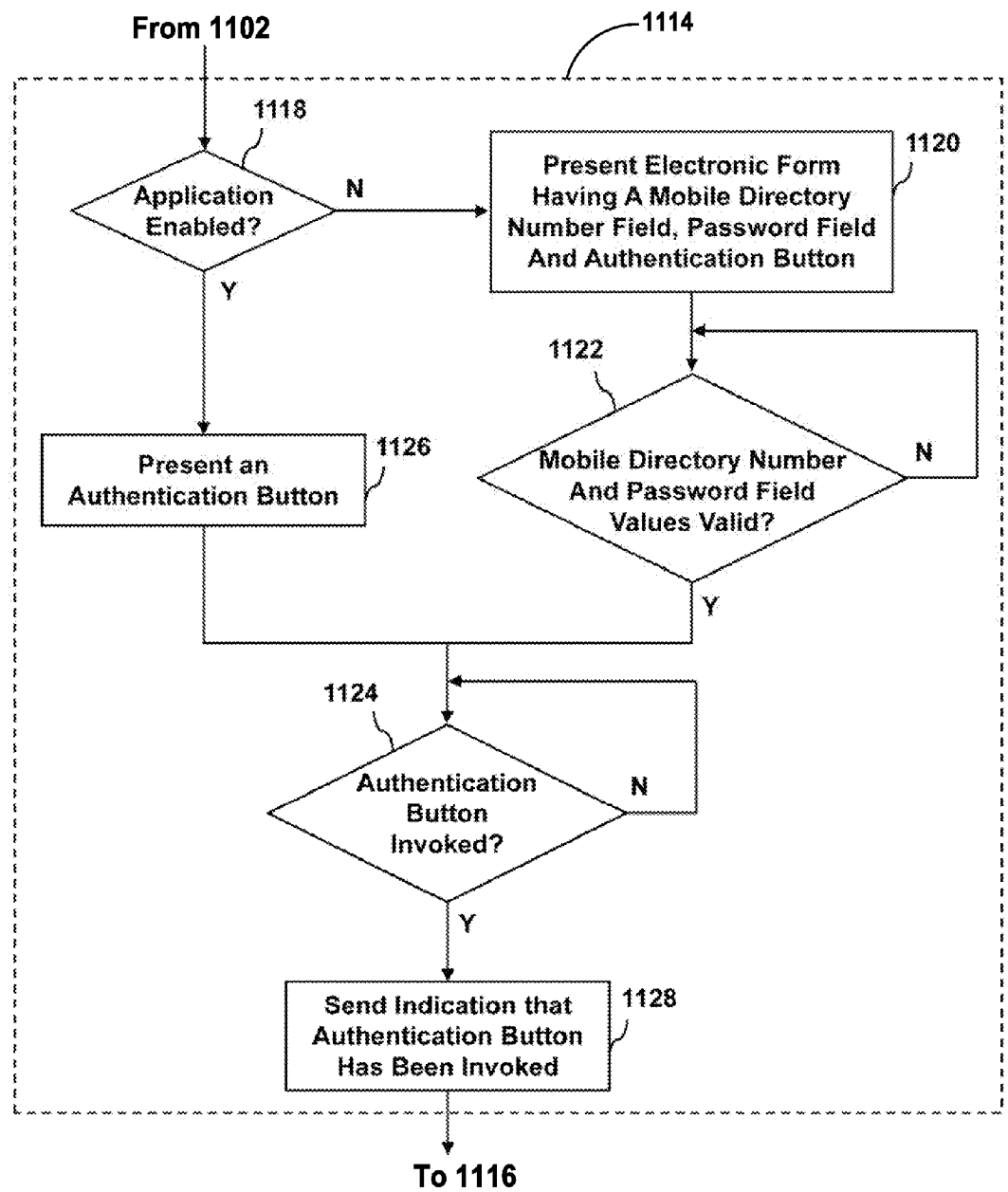
FIGS. 15-16 are flowcharts showing additional detail for some steps of the method shown in FIG. 14 in accordance with an example embodiment of the invention.

FIG. 15 is a flowchart showing additional detail for providing the invocation element 832 in the block 1114 of FIG. 14 in accordance with an example embodiment. First, at a decision block 1118, it is determined whether the application has been enabled. If the application has not been enabled, an electronic form having a mobile directory number field, a password field, and an authentication button is presented, such as the form 870 shown in FIG. 13. The form 870 is presented on the mobile access point 802. However, as discussed above, the form 870 may alternatively be presented on the wireless device 804.

In the case where the application has not been enabled and the form 870 with the MDN field 872 and password field 874 is presented, both the mobile directory number and password fields must be filled in properly before the process proceeds. This determination is shown at a decision block 1122 where it is determined whether the MDN and password fields are filled in properly. Then, it is determined whether the authentication button 832 has been activated at a decision block 1124.

If the application has already been enabled, the authentication button 832 is presented to the user at a block 1126. The authentication button 832 may appear alone in this case, but may also appear in combination with one or more fields on a form. Then, it is determined whether the authentication button 832 has been activated at the decision block 1126. This activation of the authentication button 832 is also referred to as an invocation of the authentication button 832. If it is determined that the authentication button 832 has been activated at the decision block 1126, an indication that the authentication button 832 has been activated is sent to the authentication system 800 at a block 1128 and the process proceeds to the block 1116 shown in FIG. 14.

Figure 16:
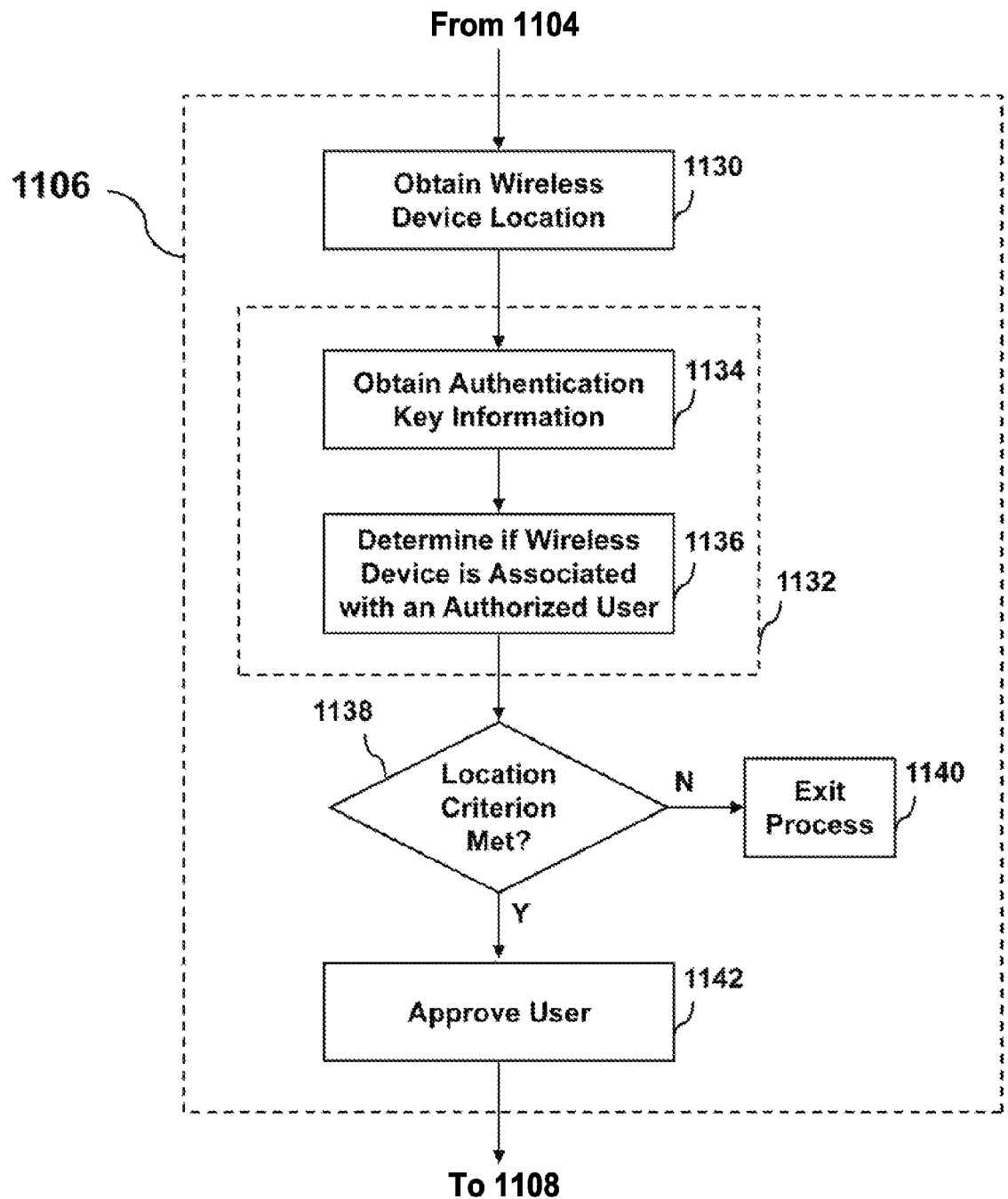

FIG. 16 is a flowchart showing additional detail for generating an authentication result based on a predetermined location criterion in the block 1106 of FIG. 14 in accordance with an example embodiment. First, at a block 1130, wireless device location information relating to a location of the wireless device 804 shown in FIG. 12 is obtained. Then, at a block 1132, it is determined whether the wireless device 804 is associated with an authorized user of the application requiring secure access. In the example shown, the determination performed in the block 1132 includes obtaining authentication key information from the wireless device 804 at a block 1134 followed by determining if the wireless device 804 is associated with an authorized user based on the authentication key information at a block 1136. Obtaining authentication key information at the block 1134 is optional, however, in embodiments where the authentication key information is not used later in the method 1100, such as an embodiment where it is determined if the wireless device is associated with an authorized user at the block 1136 based on a previously registered association between a wireless device identifier associated with the wireless device 804 and an application identifier associated with the application requiring secure access using the authentication system 800. This previously registered association may be a database entry stored in the system 800 or the application server 850, for example.

Then, at a decision block 1138, it is determined whether a predetermined location criterion related to at least one of the obtained wireless device 804 location and a location of the mobile access point 802 has been met. In an example embodiment, this location criterion uses a predetermined authentication distance such that the wireless device 804 location must be within the predetermined authentication distance from the mobile access point 802 for the location criterion to be met. However, many other location criteria may also be used, such as by using probabilistic behavioral modeling that uses the location of the wireless device 804 and/or the wireless access point 802 as a factor in generating a value that represents the probability that the user is not fraudulent. Additional examples of location criteria include the use of short-range radio frequency communications such as Bluetooth between the wireless device 804 and the mobile access point 802 to establish that the wireless device 804 is within a relative proximity of the mobile access point 802, and allowing access based on the relative locations rather than physical geographic locations of the wireless 804 and the mobile access point 802. Furthermore, location criteria may be obtained by the authentication system 800, the application server 850, the electronic device 854, the private network 852 and/or the location based services provider 860 directly or indirectly from a wireless network services provider represented, for example, by the mobile access point such as the mobile access point 210 shown in FIG. 2. If the location criterion has not been met, the process ends at an exit block 1140. If the location criterion has been met, the user is approved at a block 1142 and the process proceeds to the block 1108 shown in FIG. 14.

In accordance with the principles of the present invention, a Wireless Device Based User Authentication system that is invoked by a single user action has been provided. The system has utility for enhancing security of on-line websites and services, on-line purchases, on-line banking, on-line gaming, on-line media and content, on-line sharing of data, on-line interactive messaging systems, on-line social networking, on-line communications systems, an on-line user authentication service, user registration for an on-line service (e.g. as provided through client applications) or any computer software- or hardware-based service requiring secure access. The system may complement or supplant the use of usernames, passwords and other knowledge factors to authenticate users of computers, computer applications, networks, systems or devices. Furthermore, the present invention has utility providing a means of identity authentication for access or entry into residences, businesses, buildings, automobiles, garages, gates, computer applications, computer networks, computer devices or any automated or electronic system where secure access is desired or required.

The present invention provides multiple benefits. The use of a Wireless Device Based User Authentication system invoked by a single user action may significantly reduce incidents of identity theft and identity deception. The present invention provides robust identity authentication for any type of computer-based application access where security is a concern. It is desirable to have an automated system that enables individuals to use a single hardware token as a universal ownership authentication factor and the hardware device itself to be a commonly used device that individuals have with them at all times. Use of a Wireless Device Based User Authentication system as described in the present invention adds utility to a multiplicity of computer applications, networks and devices requiring secure user access and authentication. Invocation of the authentication system by a single user action provides increased security and ease of use.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for authenticating a previously registered user of an application requiring secure access to the application using a mobile access point, a computerized authentication system, and a wireless device associated with the user, the method comprising:
provide an invocation element on at least one of the wireless device and the mobile access point, the invocation element capable of being activated by a single user action;
receiving an indication at the computerized authentication system that the invocation element has been activated;
obtaining a location of the wireless device; determining whether the wireless device is associated with an authorized user based on a previously registered association between a wireless device identifier associated with the wireless device and an application identifier associated with the application using the computerized authentication system;
approving the user to use the application using the computerized authentication system based on a predetermined location criterion related to at least one of the obtained wireless device location and a location of the mobile access point, when the wireless device is associated with an authorized user; and producing an indication on at least one of the mobile access point and the wireless device that the user has been authenticated when the user was approved using the authentication system, whereby the user can be reliably authenticated for use of the application with a single activation of the invocation element.

2. The method of claim 1, further comprising: storing user identity data that includes a mobile directory number associated with the wireless device; and enabling single-action authentication for the application, wherein storing the user identity data and enabling single-action authentication are performed before providing the invocation element.

3. The method of claim 2, wherein the mobile directory number is the wireless device identifier.

4. The method of claim 1, wherein providing the invocation element includes presenting an electronic form that includes the invocation element.

5. The method of claim 4, wherein during a first presentation to the user, the electronic form includes a mobile directory number field and the method further includes entering a mobile directory number associated with the wireless device in the mobile directory number field before activating the invocation element.

6. The method of claim 5, wherein during the first presentation to the user, the electronic form also includes an additional field, and wherein the additional field must be populated by the user the first time the electronic form is presented to the user before the invocation element can be activated.

7. The method of claim 6, wherein the additional field is a password field.

8. The method of claim 6, wherein during a subsequent presentation to the user, the invocation element is capable of being activated without entry of information in the form.

9. The method of claim 1, wherein the invocation element includes an authentication button presented on a display associated with the mobile access point and wherein the single user action includes selecting the authentication button with a user interface device associated with the mobile access point.

10. The method of claim 1, wherein the invocation element includes a button displayed on the wireless device and wherein the single user action includes selecting the button with the wireless device.

11. The method of claim 1, wherein the application is in data communication with the mobile access point over a network.

12. The method of claim 1, wherein providing the invocation element is implemented by remotely providing an electronic form to the user from the application to the mobile access point over a network.

13. The method of claim 1, wherein the step of providing the invocation element includes locally providing the invocation element on a display associated with the mobile access point from the application, wherein the mobile access point is a computer locally running the application.

14. A computerized authentication system for authenticating a previously registered user of an application requiring secure access to the application using a mobile access point and a wireless device associated with the user, the computerized authentication system comprising:
invocation element means for providing an invocation element capable of being activated by a single user action on at least one of the wireless device and the mobile access point;
indicator receiving means for receiving an indication at the computerized authentication system that the invocation element has been activated;
location obtaining means for obtaining a location of the wireless device; association means for determining whether the wireless device is associated with an authorized user based on a previously registered association between a wireless device identifier associated with the wireless device and an application identifier associated with the application;
approving means for approving the user to use the application based on a predetermined location criterion related to at least one of the obtained wireless device location and a location of the mobile access point, when the wireless device is associated with an authorized user; and
indication means for producing an indication on at least one of the mobile access point and the wireless device that the user has been authenticated when the user was approved, whereby the user can be reliably authenticated for use of the application with a single activation of the invocation element.

15. The system of claim 14, further comprising: storage means for storing user identity data that includes a mobile directory number associated with the wireless device; and single-action enabling means for enabling single-action authentication for the application, wherein the invocation element means is configured to provide the invocation element based on the enabled single-action authentication for the application, and wherein the association means is configured to determine whether the wireless device is associated with an authorized user based on the stored user identity data.

16. The system of claim 15, wherein the mobile directory number is the wireless device identifier.

17. The system of claim 14, wherein the invocation element means is configured to present an electronic form that includes the invocation element.

18. The system of claim 17, wherein during a first presentation to the user, the electronic form also includes a mobile directory number field, and wherein the system further includes mobile directory number receiving means for receiving a mobile directory number entered in the mobile directory number field wherein the association means is configured to determine whether the wireless device is associated with an authorized user based on the received mobile directory number.

19. The system of claim 18, wherein during the first presentation to the user, the electronic form also includes an additional field, and wherein the additional field must be populated by the user the first time the electronic form is presented to the user before the invocation element can be activated.

20. A system for authenticating a previously registered user of an application requiring secure access to the application using a mobile access point in data communication with the application and a wireless device associated with the user, the system comprising:
a memory; and
a processor in data communication with the memory, the mobile access point, and the wireless device, wherein the processor is configured to:
provide an invocation element capable of being activated by a single user action on at least one of the wireless device and the mobile access point;
receive an indication that the invocation element has been activated;
obtain a location of the wireless device;
determine whether the wireless device is associated with an authorized user based on a previously registered association between a wireless device identifier associated with the wireless device and an application identifier associated with the application;

approve the user to use the application based on a predetermined location criterion related to at least one of the obtained wireless device location and a location of the mobile access point, when the wireless device is associated with an authorized user; and produce an indication on at least one of the mobile access point and the wireless device that the user has been authenticated when the user was approved, whereby the user can be reliably authenticated for use of the application with a single activation of the invocation element.

\* \* \* \* \*